US012759658B2

(12) United States Patent
Yoshiura

(10) Patent No.: US 12,759,658 B2
(45) Date of Patent: Oct. 13, 2026

(54) UNDER COWL

(71) Applicant: SUZUKI MOTOR CORPORATION, Hamamatsu (JP)

(72) Inventor: Toshiaki Yoshiura, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 266 days.

(21) Appl. No.: 18/640,440

(22) Filed: Apr. 19, 2024

(65) Prior Publication Data

US 2024/0351653 A1 Oct. 24, 2024

(30) Foreign Application Priority Data

Apr. 21, 2023 (JP) ................................ 2023-070129

(51) Int. Cl.
*B62J 17/10* (2020.01)
*B62J 17/02* (2006.01)
*B62M 7/02* (2006.01)

(52) U.S. Cl.
CPC ............... *B62J 17/10* (2020.02); *B62J 17/02* (2013.01); *B62M 7/02* (2013.01)

(58) Field of Classification Search
CPC . B62J 17/02; B62J 17/06; B62J 17/10; B60K 11/08
See application file for complete search history.

(56) References Cited

U.S. PATENT DOCUMENTS

2005/0146153 A1* 7/2005 Keys ........................ B62J 23/00 296/78.1
2006/0037798 A1* 2/2006 Konno ..................... B62J 17/02 180/219
2006/0283647 A1* 12/2006 Seki ......................... B62J 17/02 180/219
2007/0257478 A1* 11/2007 Metzikis .................. B62J 17/02 280/770

(Continued)

FOREIGN PATENT DOCUMENTS

EP 1496241 A2 * 1/2005 ............. B62J 17/10
EP 1958860 A2 * 8/2008 ............. B62J 17/10

(Continued)

OTHER PUBLICATIONS

Extended European Search Report dated Sep. 9, 2024, issued by the European Patent Office in corresponding application EP 24171466.6.

*Primary Examiner* — Gregory A Blankenship
(74) *Attorney, Agent, or Firm* — Stein IP LLC

(57) ABSTRACT

An under cowl includes a right wall portion, a left wall portion, and a front wall portion. The front wall portion includes a first wind receiving plate and a second wind receiving plate. Each of the first and second wind receiving plates include a wind receiving surface that extends in front-rear and left-right directions, that is inclined such that a front edge portion is lower than a rear edge portion, and that receives a traveling wind that flows from an upper front side to a lower rear side of the front wall portion. The second (Continued)

wind receiving plate is disposed such that a front end portion thereof is on an upper side and a rear side with respect to a front end portion of the first wind receiving plate. A gap is provided between the first wind receiving plate and the second wind receiving plate.

11 Claims, 12 Drawing Sheets

(56) References Cited

U.S. PATENT DOCUMENTS

2008/0156559 A1* 7/2008 Kitamura ................. B62J 17/02
180/219
2009/0108630 A1* 4/2009 Nakao ...................... B62J 17/10
296/192
2009/0127884 A1 5/2009 Takahashi et al. ............. 296/96
2009/0178870 A1* 7/2009 Takahashi .................. B62J 3/04
296/192
2013/0214553 A1* 8/2013 Tsukui ..................... B62J 17/06
296/78.1
2014/0202782 A1* 7/2014 Tsukui ..................... B62J 25/02
362/475
2022/0073166 A1* 3/2022 Nakayama ............... B62J 17/02
2023/0202604 A1* 6/2023 Shikanai .................. B62J 17/02
280/304.3
2024/0351653 A1* 10/2024 Yoshiura .................. B62J 17/10

FOREIGN PATENT DOCUMENTS

| | | | | |
|---|---|---|---|---|
| EP | 2 077 221 | A2 | | 12/2008 |
| JP | H 11-079032 | A | | 3/1999 |
| JP | 2005-178621 | A | | 7/2005 |
| JP | 2009-107562 | A | | 5/2009 |
| JP | 2011051411 | A | * | 3/2011 |
| JP | 7056352 | B2 | | 4/2022 |

* cited by examiner

UNDER COWL

CROSS-REFERENCE TO RELATED APPLICATIONS

The disclosure of Japanese Patent Application No. 2023-070129 filed on Apr. 21, 2023, including specification, drawings and claims is incorporated herein by reference in its entirety.

TECHNICAL FIELD

The present invention relates to an under cowl provided in a straddle-type vehicle.

BACKGROUND ART

Many straddle-type vehicles include a cowl. The cowl has a function of rectifying or controlling a traveling wind, reducing air resistance, improving aerodynamic performance of a vehicle, and protecting an occupant from the traveling wind.

The cowl generally covers a vehicle body of a straddle-type vehicle, and is classified in detail depending on which part of the vehicle body the cowl covers. However, a method for classifying the cowl and a name of each classified cowl are not constant. For example, when compared with description of paragraphs [0017] to [0021] in JP2005-178621A, description of paragraphs [0009] to [0010] in JPH11-79032A, and description of paragraphs [0013] to [0015] in JP2009-107562A, that can be seen. Therefore, in the present specification, a cowl that covers a front portion of a head pipe in a straddle-type vehicle is referred to as a "front cowl". Further, a cowl that covers a portion extending from a side of a lower portion of the head pipe or an upper portion of a front fork to an upper portion side of a power unit (for example, an engine) in the straddle-type vehicle is referred to as a "side cowl". Further, a cowl that covers at least a portion extending from a rear side of a front wheel to a lower portion front side of the power unit in the straddle-type vehicle is referred to as an "under cowl".

The straddle-type vehicle includes various forms such as a vehicle including a front cowl, left and right side cowls, and an under cowl (see FIG. 1 in JP2005-178621A), a vehicle including only a front cowl, and a vehicle including only an under cowl. A form including a front cowl, left and right side cowls, and an under cowl is generally referred to as a full cowl.

SUMMARY OF INVENTION

During traveling of the straddle-type vehicle, a traveling wind hits from a front side of a vehicle. A part of the traveling wind passes through a space between the front cowl and the front fender, changes an orientation to a lower rear side so as to be along the front fender, and hits a front portion of the under cowl. Therefore, a wind receiving surface that receives the traveling wind that flows to the lower rear side is formed at the front portion of the under cowl, whereby a force that presses the vehicle downward (downforce) can be generated. When the downforce is generated, lifting up (front lift) of a front wheel from a road surface can be prevented, and a traveling posture of a vehicle can be stabilized.

When the wind receiving surface described above is provided at the front portion of the under cowl in a wide range, a large downforce can be generated. However, in the straddle-type vehicle, a heat generating body such as an engine or an exhaust pipe is disposed on a rear side, an upper side, or an inner side of the under cowl. Therefore, when the wind receiving surface described above is provided at the front portion of the under cowl in a wide range, there is a problem that heat generated from the heat generating body accumulates in the under cowl, and a temperature of an engine or the like easily increases.

The present invention has been made in view of, for example, the above problems, and an object thereof is to provide an under cowl that can increase a downforce generated by receiving a traveling wind that flows from an upper front side to a lower rear side of a front portion of the under cowl, and that can prevent heat accumulation in the under cowl.

An aspect of the present embodiment is an under cowl that is provided at a straddle-type vehicle including a front wheel, a rear wheel, and a power unit provided between the front wheel and the rear wheel, and that covers a portion on a rear side of the front wheel and a lower portion front side of the power unit in the straddle-type vehicle. The under cowl includes a right wall portion, a left wall portion, and a front wall portion. The front wall portion includes a first wind receiving plate including a wind receiving surface that extends in front-rear and left-right directions, that is inclined such that a front edge portion is lower than a rear edge portion, and that receives a traveling wind that flows from an upper front side to a lower rear side of the front wall portion, and a second wind receiving plate including a wind receiving surface that extends in front-rear and left-right directions, that is inclined such that a front edge portion is lower than a rear edge portion, and that receives the traveling wind. The second wind receiving plate is disposed such that a front end portion thereof is on an upper side and a rear side with respect to a front end portion of the first wind receiving plate. A gap is provided between the first wind receiving plate and the second wind receiving plate.

According to the present invention, it is possible to increase a downforce generated by receiving a traveling wind that flows from an upper front side to lower rear side of a front portion of an under cowl, and to prevent heat accumulation in the under cowl.

DESCRIPTION OF EMBODIMENTS

Figure 1:
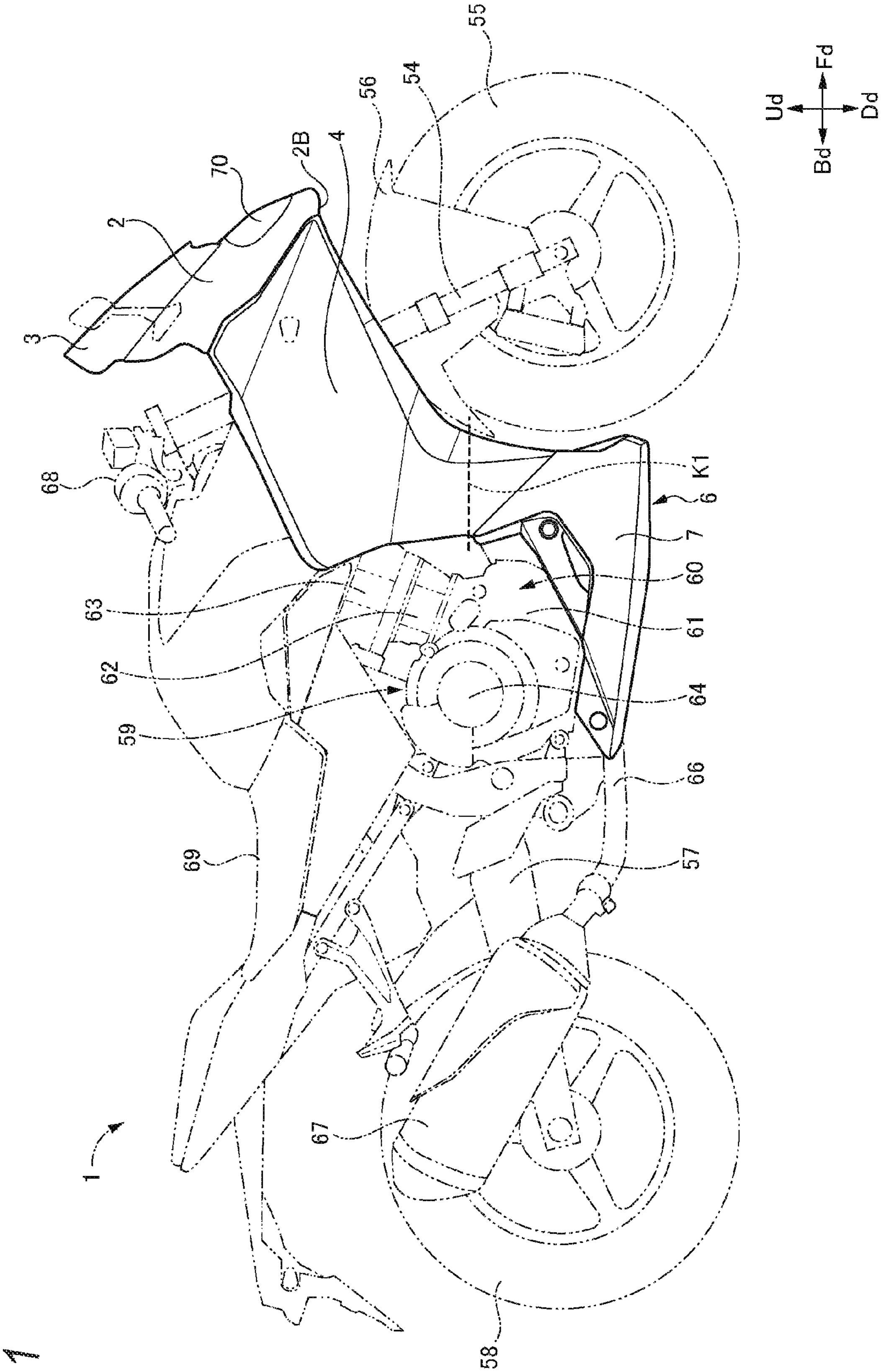
FIG. 1 is an illustrative diagram showing a state where a straddle-type vehicle in which an under cowl according to an embodiment of the present invention is provided is viewed from a right side.

An under cowl according to an embodiment of the present invention is provided in a straddle-type vehicle including a front wheel, a rear wheel, and a power unit provided between the front wheel and the rear wheel. Further, the under cowl according to the present embodiment covers a portion on a rear side of the front wheel and a lower portion front side of the power unit in the straddle-type vehicle. Further, the under cowl according to the present embodiment includes a right wall portion, a left wall portion, and a front wall portion.

The front wall portion includes a first wind receiving plate and a second wind receiving plate. Each of the first wind receiving plate and the second wind receiving plate includes a wind receiving surface that receives a traveling wind that flows from an upper front side to a lower rear side of the front wall portion. Each of the wind receiving surface of the first wind receiving plate and the wind receiving surface of the second wind receiving plate extends in front-rear and left-right directions, and is inclined such that a front edge portion is lower than a rear edge portion. Further, the second wind receiving plate is disposed such that a front end portion thereof is on an upper side and a rear side with respect to a front end portion of the first wind receiving plate. Further, a gap is provided between the first wind receiving plate and the second wind receiving plate.

During traveling of the straddle-type vehicle, a part of a traveling wind that flows from a front side of a vehicle toward the vehicle passes through, for example, a space between a front cowl and a front fender, changes an orientation to a lower rear side so as to be along the front fender, and flows from an upper front side to the lower rear side of a front wall portion of the under cowl. In the under cowl according to the present embodiment, the wind receiving surface of each of the first wind receiving plate and the second wind receiving plate extends in front-rear and left-right directions, and is inclined such that a front edge portion is lower than a rear edge portion. As described above, both the wind receiving surface of the first wind receiving plate and the wind receiving surface of the second wind receiving plate extend in a direction in which a traveling wind that flows from the upper front side to the lower rear side of the front wall portion of the under cowl is blocked. Further, the second wind receiving plate is disposed such that a front end portion thereof is on an upper side and a rear side with respect to a front end portion of the first wind receiving plate. Since the second wind receiving plate is disposed as described above, the traveling wind that flows from the upper front side to the lower rear side of the front wall portion hits the wind receiving surfaces of the first wind receiving plate and the second wind receiving plate. Therefore, according to the under cowl of the present embodiment, for example, the traveling wind that passes through the space between the front cowl and the front fender and that changes the orientation to the lower rear side so as to be along the front fender can be received by the wind receiving surfaces of the first wind receiving plate and the second wind receiving plate. Accordingly, as compared with a related-art under cowl including no such a wind receiving surface, a large downforce can be generated, and a traveling posture of a vehicle can be stabilized.

In the under cowl according to the present embodiment, a gap is provided between the first wind receiving plate and the second wind receiving plate. The inside and the outside of the under cowl communicate with each other via the gap. During traveling of the straddle-type vehicle, the traveling wind flows into the under cowl from the outside via the gap. High-temperature air in the under cowl can be pushed out to the outside of the under cowl by the traveling wind. Accordingly, heat generated from a heat generating body such as an engine or an exhaust pipe can be prevented from being accumulated in the under cowl.

Embodiment

An embodiment of the present invention will be described with reference to the drawings. When describing directions of up (Ud), down (Dd), front (Fd), rear (Bd), left (Ld), and right (Rd) in the embodiment, the directions follow arrows drawn on a lower right side in each drawing.

Straddle-Type Vehicle

Figure 2:
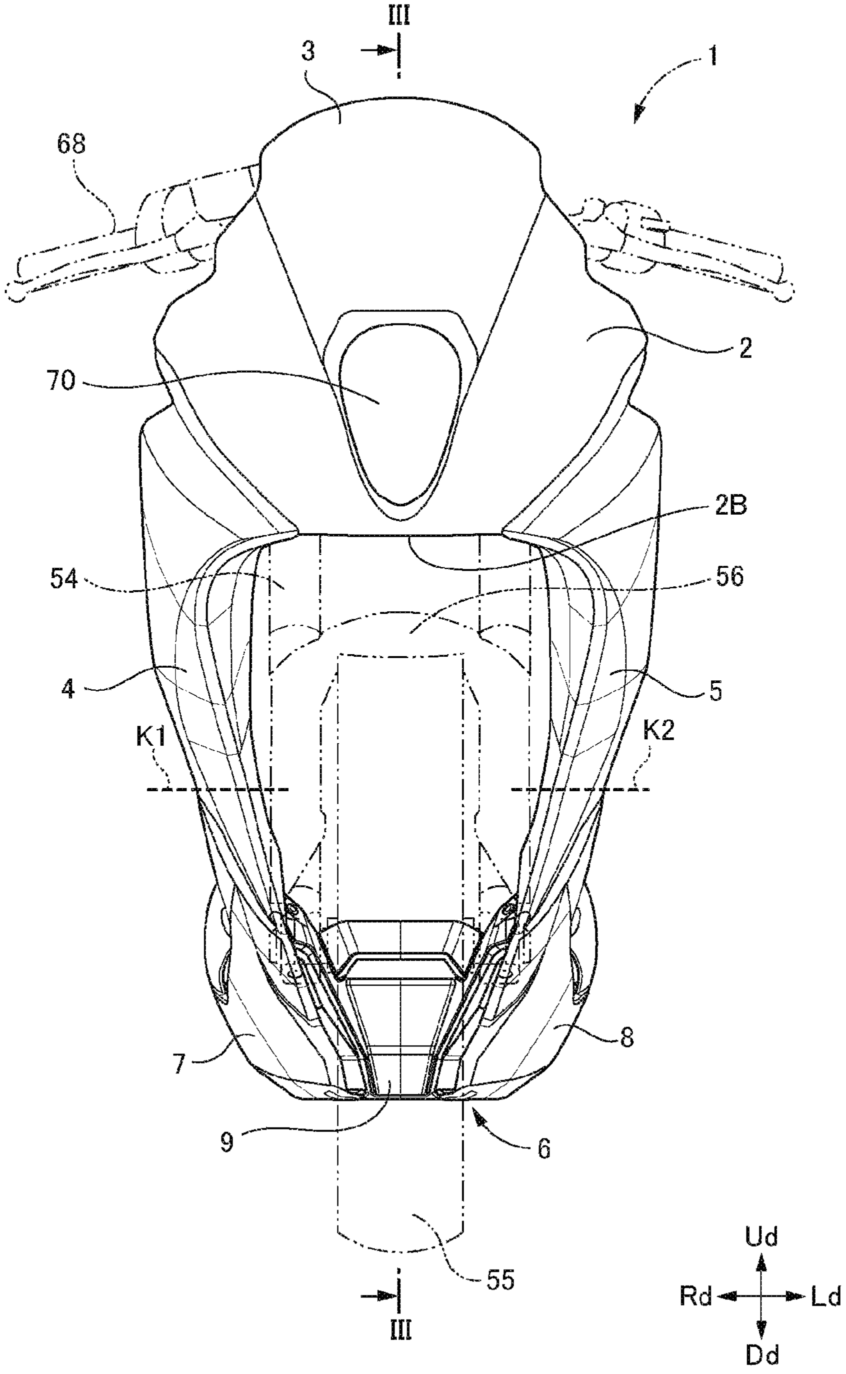
FIG. 2 is an illustrative diagram showing a state where the straddle-type vehicle in FIG. 1 is viewed from a front side.
Figure 3:
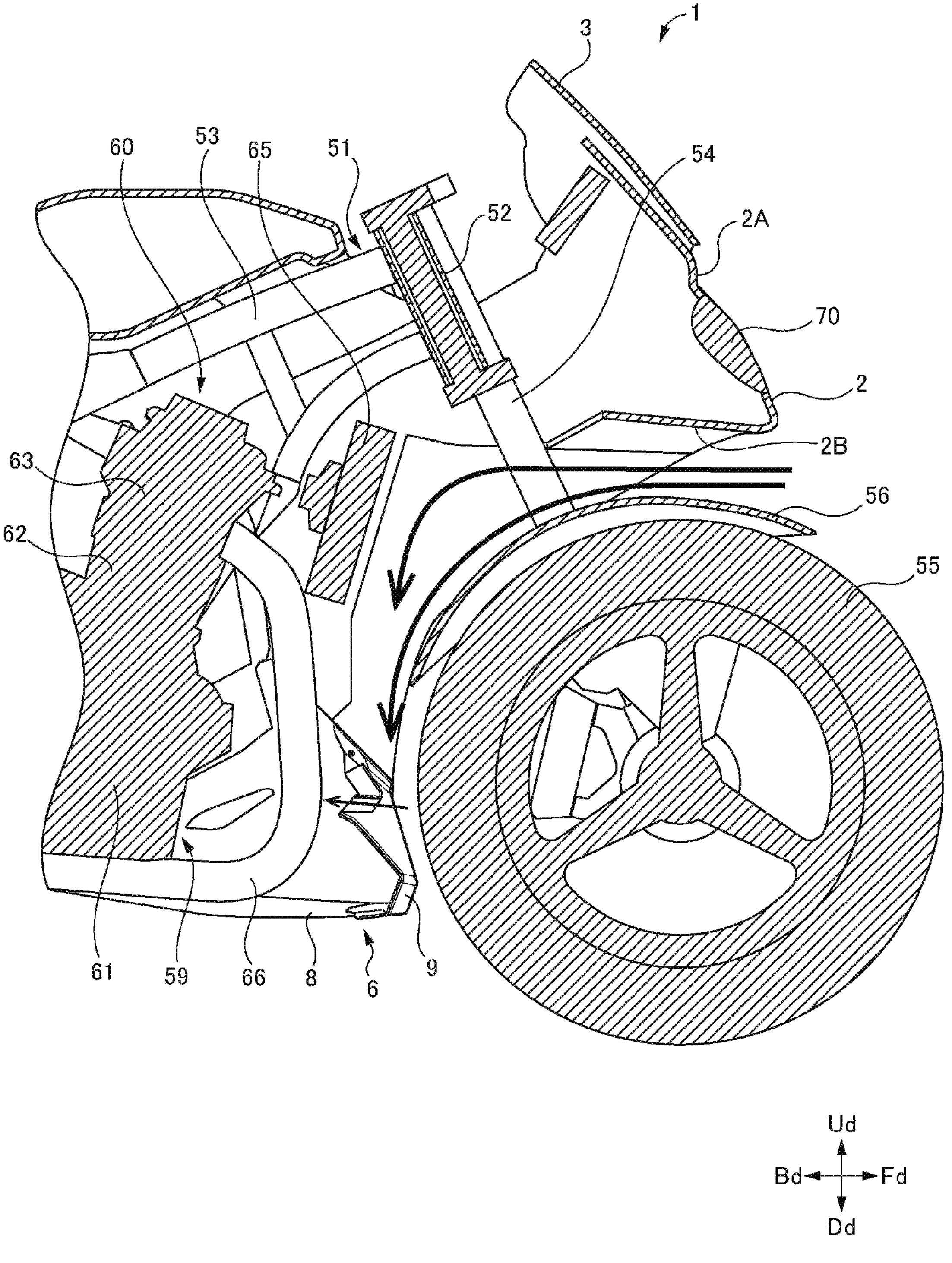
FIG. 3 is an illustrative diagram schematically showing a state where a cross section of the straddle-type vehicle taken along a cutting line III-III in FIG. 2 is viewed from a right side.

FIG. 1 shows a state where a straddle-type vehicle 1 on which an under cowl 6 according to the present embodiment is provided is viewed from a right side. FIG. 2 shows a state where the straddle-type vehicle 1 is viewed from a front side. In FIGS. 1 and 2, for convenience of description, in the straddle-type vehicle 1, portions other than a front cowl 2, a windscreen 3, side cowls 4 and 5, and the under cowl 6 are indicated by two-dot chain lines. FIG. 3 schematically shows a state where a cross section of the straddle-type vehicle 1 taken along a cutting line III-III in FIG. 2 is viewed from a right side (left side in FIG. 2). In FIG. 3, illustration of a handle 68 is omitted.

As shown in FIG. 3, the straddle-type vehicle 1 includes a vehicle body frame 51 that forms a skeleton of the straddle-type vehicle 1. The vehicle body frame 51 includes a head pipe 52 and two main frames 53. The two main frames 53 are respectively disposed on left and right portions of the straddle-type vehicle 1, and extend rearward from an upper portion of the head pipe 52. In FIG. 3, only the left main frame 53 is shown. Further, a front wheel 55, which is a steered wheel, is supported by the head pipe 52 via a front fork 54. Further, a front fender 56 is provided on the front fork 54. The front fender 56 substantially covers the front wheel 55 from above. An upper surface of the front fender 56 extends in an arc shape substantially from an upper front side to a rear side of the front wheel 55.

As shown in FIG. 1, a rear wheel 58, which is a driving wheel, is supported by a rear portion of the vehicle body frame 51 of the straddle-type vehicle 1 via a swing arm 57. Further, in the straddle-type vehicle 1, a power unit 59 is provided between the front wheel 55 and the rear wheel 58. The power unit 59 is supported by the vehicle body frame 51. The power unit 59 is an apparatus that generates power that causes the straddle-type vehicle 1 to travel. A front portion of the power unit 59 is provided with an engine 60 serving as an internal combustion engine. A rear portion of the power unit 59 is provided with a transmission 64 including a clutch. Further, the engine 60 includes a crankcase 61. A cylinder 62 is provided above the crankcase 61. A cylinder head 63 is provided above the cylinder 62.

As shown in FIG. 3, in the straddle-type vehicle 1, a radiator 65 is provided on a front side of the cylinder head 63. The radiator 65 is an apparatus that cools, by using traveling wind, a coolant for cooling the engine 60. Further, an exhaust pipe 66 is arranged on a front side and a lower side of the engine 60. One end of the exhaust pipe 66 is connected to an exhaust port provided at the cylinder head 63, extends downward between the front wheel 55 and the engine 60 from the exhaust port, and then extends rearward below the crankcase 61. As shown in FIG. 1, a silencer 67 is connected to the other end of the exhaust pipe 66. Further, the handle 68 is provided above the head pipe 52. Further, a seat 69 in which an occupant sits is provided on an upper rear side of the power unit 59.

The straddle-type vehicle 1 is a full-cowl-type vehicle. As shown in FIGS. 1 and 2, the straddle-type vehicle 1 is provided with the front cowl 2, the pair of left and right side cowls 4 and 5, and the under cowl 6.

The front cowl 2 is disposed on a front side of the head pipe 52, and covers a front portion of the head pipe 52 in the straddle-type vehicle 1. As shown in FIG. 3, a front surface 2A of the front cowl 2 extends to a lower front side from a front side of an upper end portion of the head pipe 52. A lower surface 2B of the front cowl 2 extends substantially horizontally rearward from substantially a front side of a lower end portion of the head pipe 52 to a position near the front fork 54. A gap is formed between the lower surface 2B of the front cowl 2 and an upper surface of a front portion of the front fender 56. Further, an upper portion of the front cowl 2 is provided with the windscreen 3, and a front portion of the front cowl 2 is provided with a headlamp 70.

The right side cowl 4 is disposed on a right side of an upper portion of the front fork 54 (a lower portion of the head pipe 52), and covers a portion extending from the right side of the upper portion of the front fork 54 to a right side of an upper portion of the power unit 59 in the straddle-type vehicle 1. Further, the right side cowl 4 covers a right end portion of the radiator 65. The left side cowl 5 is disposed on a left side of the upper portion of the front fork 54 (the lower portion of the head pipe 52), and covers a portion extending from the left side of the upper portion of the front fork 54 to a left side of the upper portion of the power unit 59 in the straddle-type vehicle 1. Further, the left side cowl 5 covers a left end portion of the radiator 65. The under cowl 6 is disposed on a rear side of the front wheel 55, and covers a portion extending from immediately behind the front wheel 55 to a lower portion of the power unit 59 in the straddle-type vehicle 1.

The front cowl 2, the side cowls 4 and 5, and the under cowl 6 are plates formed of, for example, resin, and have a complicated shape having many curved places as shown in FIGS. 1 and 2. An upper portion of the right side cowl 4 is connected to a right portion of the front cowl 2 by using a fixing member such as a rivet or a screw. An upper portion of the left side cowl 5 is connected to a left portion of the front cowl 2 by using a fixing member such as a rivet or a screw. The under cowl 6 includes a right wall portion 7, a left wall portion 8, and a front wall portion 9 as described later. The right wall portion 7 of the under cowl 6 and the right side cowl 4 are integrated with each other, and both of them are integrally molded products. A boundary between the right wall portion 7 of the under cowl 6 and the right side cowl 4 is not strictly defined. For convenience of description, it is assumed that in the integrally molded product including the right wall portion 7 of the under cowl 6 and the right side cowl 4, a portion above a broken line K1 in FIG. 1 or 2 is the right side cowl 4, and a portion below the broken line K1 is the right wall portion 7 of the under cowl 6. Further, the left wall portion 8 of the under cowl 6 and the left side cowl 5 are integrated with each other, and both of them are integrally molded products. A boundary between the left wall portion 8 of the under cowl 6 and the left side cowl 5 is not strictly defined. For convenience of description, it is assumed that in the integrally molded product including the left wall portion 8 of the under cowl 6 and the left side cowl 5, a portion above a broken line K2 in FIG. 2 is the left side cowl 5, and a portion below the broken line K2 is the left wall portion 8 of the under cowl 6. The right wall portion 7 of the under cowl 6 and the right side cowl 4 may be separated from each other, and both of them may be connected to each other by using a fixing member such as a rivet or a screw. The same also applies to the left wall portion 8 of the under cowl 6 and the left side cowl 5. Further, the front cowl 2, the side cowls 4 and 5, and the under cowl 6 are fixed to the vehicle body frame 51 and the like via, for example, metal-made stays.

Under Cowl

The under cowl 6 includes the right wall portion 7, the left wall portion 8, and the front wall portion 9. As shown in FIGS. 1 and 2, the right wall portion 7 is disposed on a right rear side of the front wheel 55, and covers from a right side a portion extending from immediately behind the front wheel 55 to the lower portion of the power unit 59 in the straddle-type vehicle 1. The left wall portion 8 is disposed on a left rear side of the front wheel 55, and covers from a left side a portion extending from immediately behind the front wheel 55 to the lower portion of the power unit 59 in the straddle-type vehicle 1.

As shown in FIG. 3, the front wall portion 9 is disposed in front of the lower portion of the power unit 59, and covers from a front side a front portion of the lower portion of the power unit 59 in the straddle-type vehicle 1. The front wall portion 9 is disposed immediately behind the front wheel 55, and is disposed in front of a lower portion of the crankcase 61. Further, the front wall portion 9 is disposed at a center of the straddle-type vehicle 1 in a left-right direction, and is located directly behind the front wheel 55. Further, when the straddle-type vehicle 1 is viewed from a front side, a lower end of the front wall portion 9 is located on a lower side with respect to a lower surface of the crankcase 61. Further, when the straddle-type vehicle 1 is viewed from the front side, an upper end of the front wall portion 9 is located on a lower side with respect to the cylinder 62, and is located at a substantially center of the crankcase 61 in an upper-lower direction. Further, a part of the exhaust pipe 66 is disposed between the front wall portion 9 and the crankcase 61. Further, the front wall portion 9 is disposed at a position slightly closer to a front side than a position directly below the radiator 65.

Inside the under cowl 6, that is, in a region surrounded by the right wall portion 7, the left wall portion 8, and the front wall portion 9, a lower portion of the crankcase 61, and a portion of the exhaust pipe 66 that passes through a region extending downward from a front side of the crankcase 61 are located. Further, the under cowl 6 does not include a lower wall portion, and a lower portion of the under cowl 6 is opened. A portion directly below the power unit 59, and a portion directly below a portion of the exhaust pipe 66 that passes through a lower side of the power unit 59 are not covered by the under cowl 6. Further, the under cowl 6 does not include an upper wall portion, and also does not include a rear wall portion.

Structures of Right Wall Portion, Left Wall Portion, and Front Wall Portion

Figure 4A:
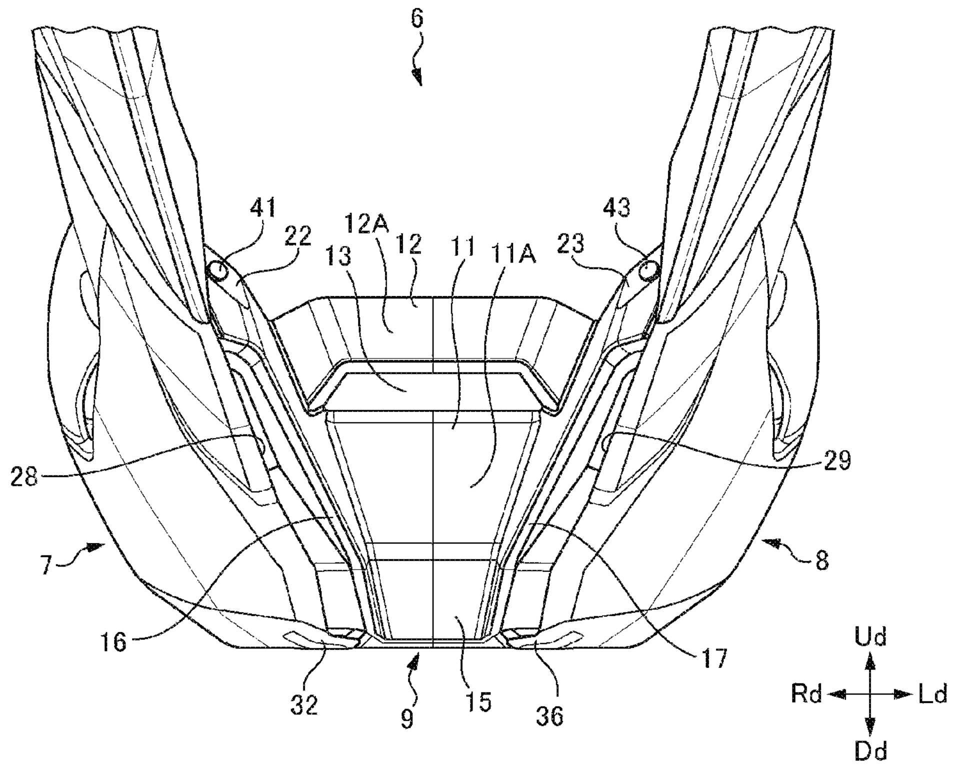
FIG. 4A and FIG. 4B are illustrative diagrams showing a state where the under cowl according to the embodiment of the present invention is viewed from a front side.
Figure 4B:
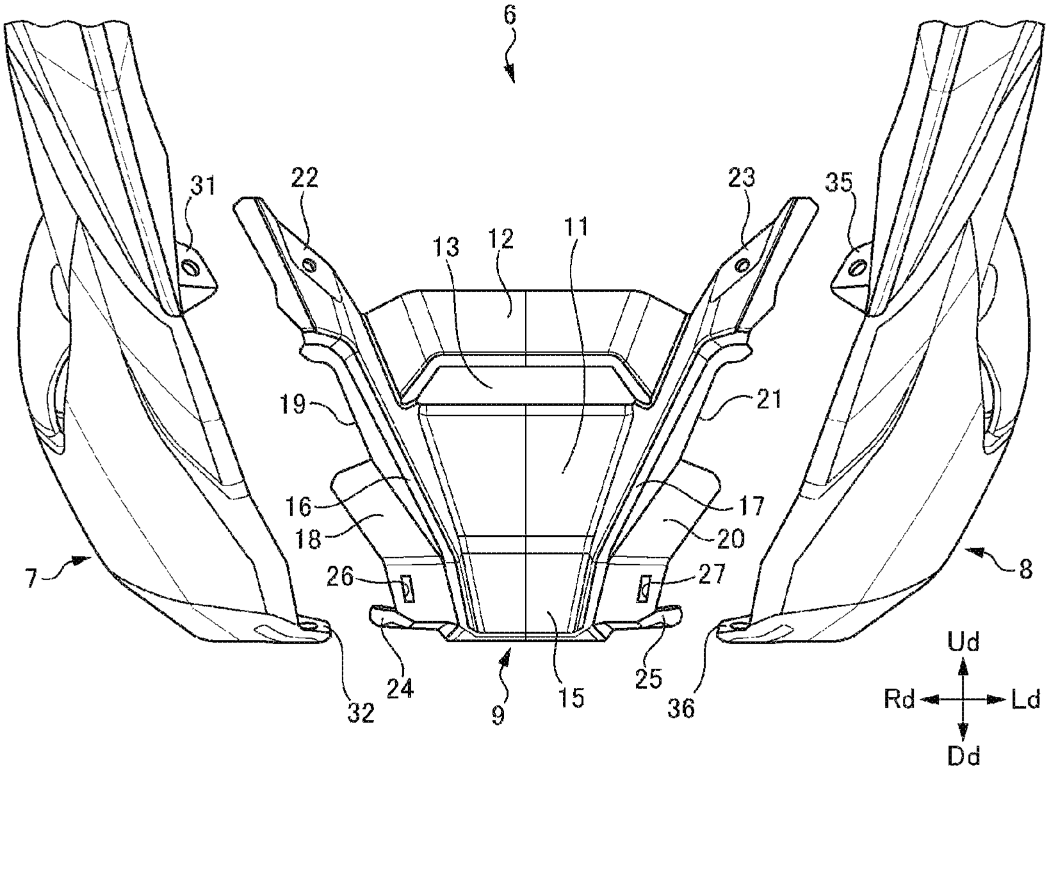
Figure 5A:
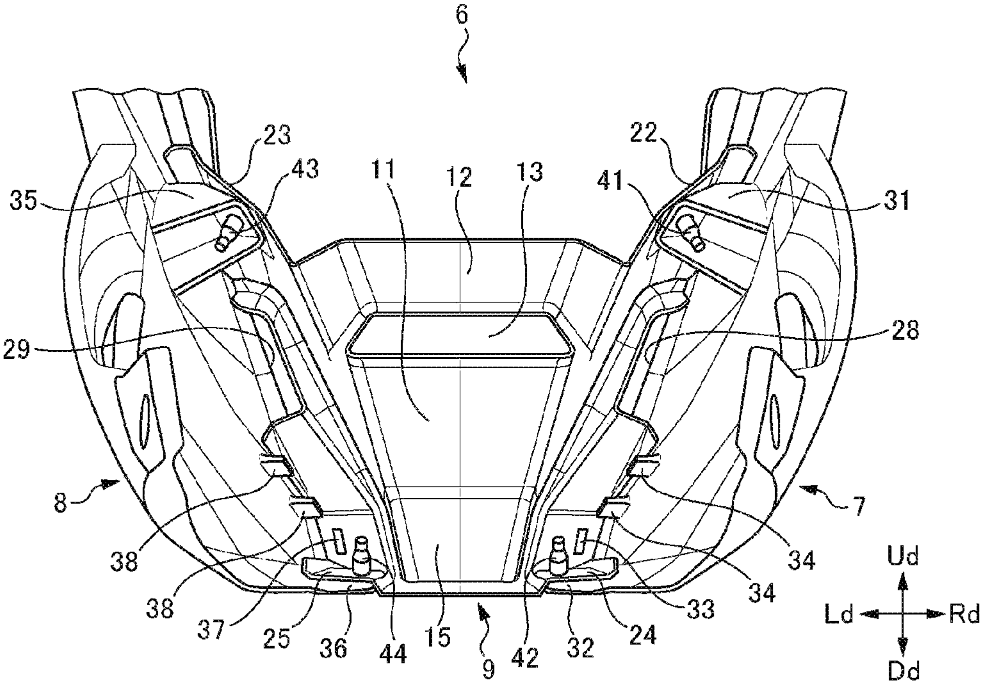
FIG. 5A and FIG. 5B are illustrative diagrams showing a state where the under cowl according to the embodiment of the present invention is viewed from a rear side.
Figure 5B:
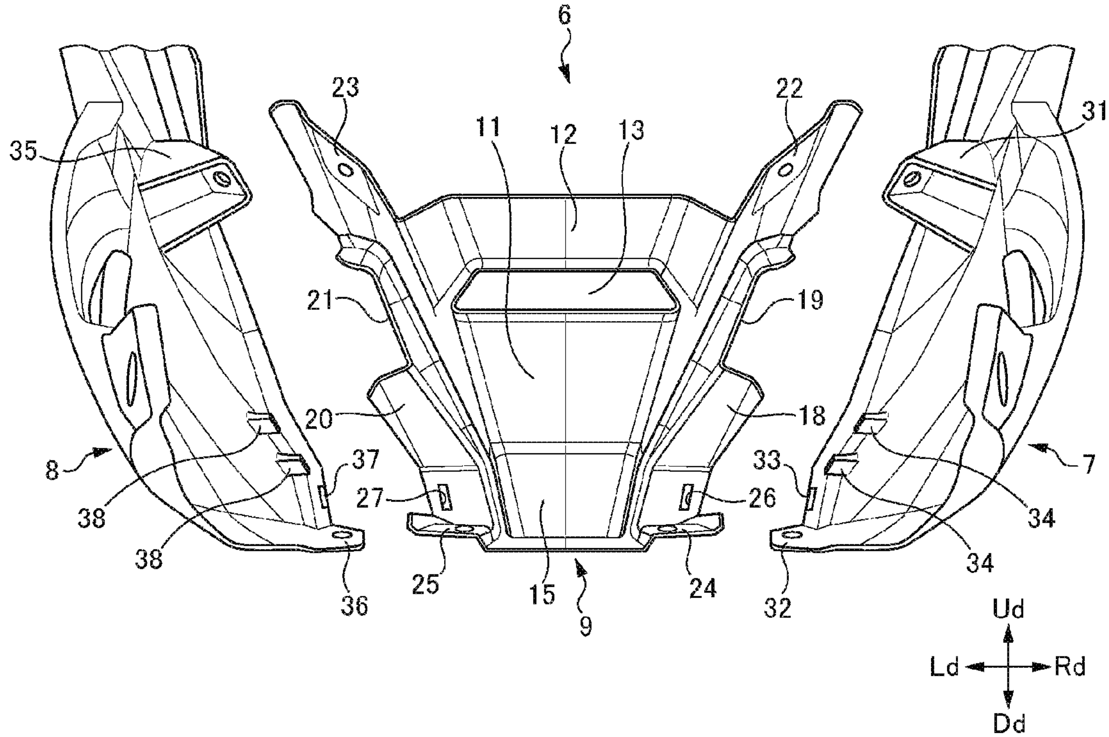
Figure 6:
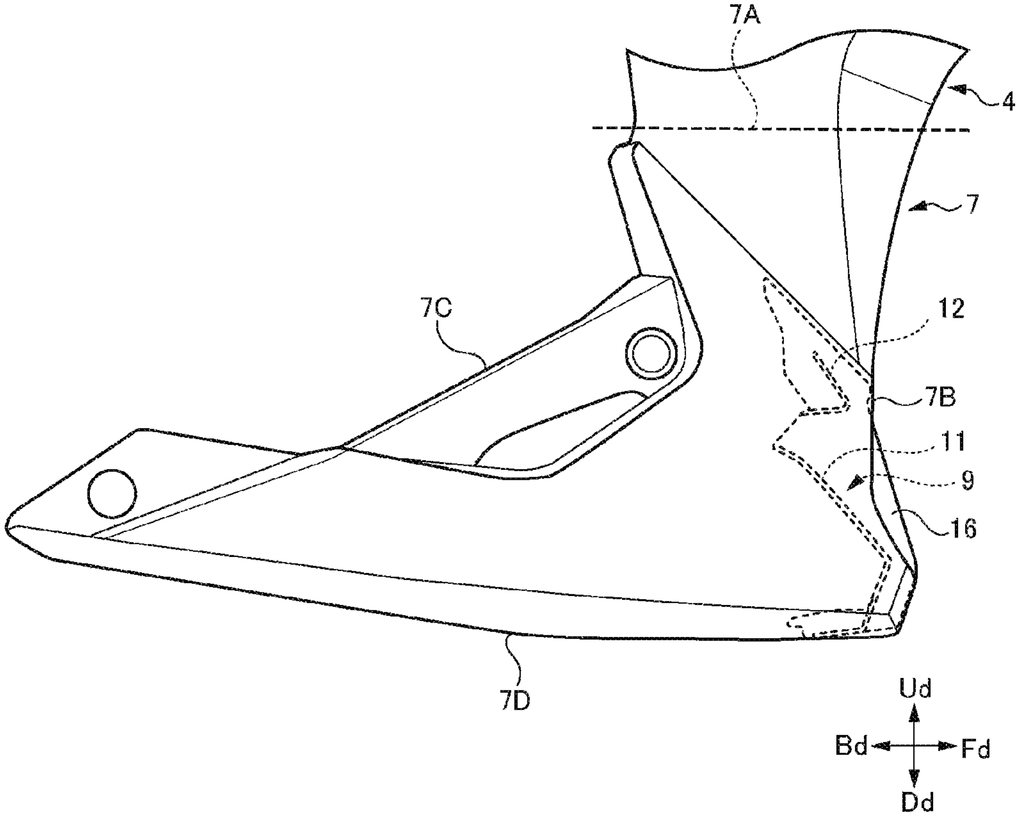
FIG. 6 is an illustrative diagram showing a state where the under cowl according to the embodiment of the present invention is viewed from a right side.
Figure 7:
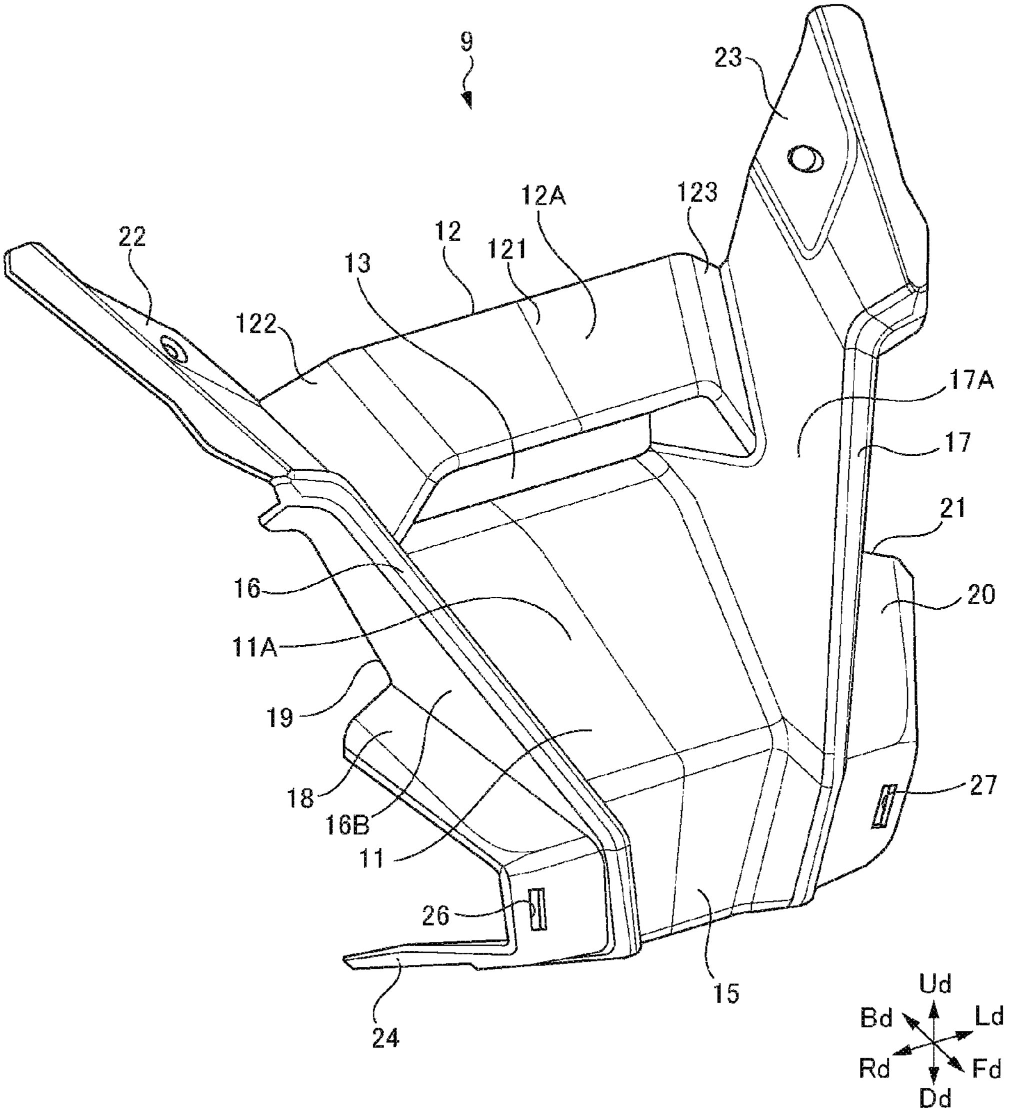
FIG. 7 is a perspective view showing a front wall portion of the under cowl according to the embodiment of the present invention.
Figure 8A:
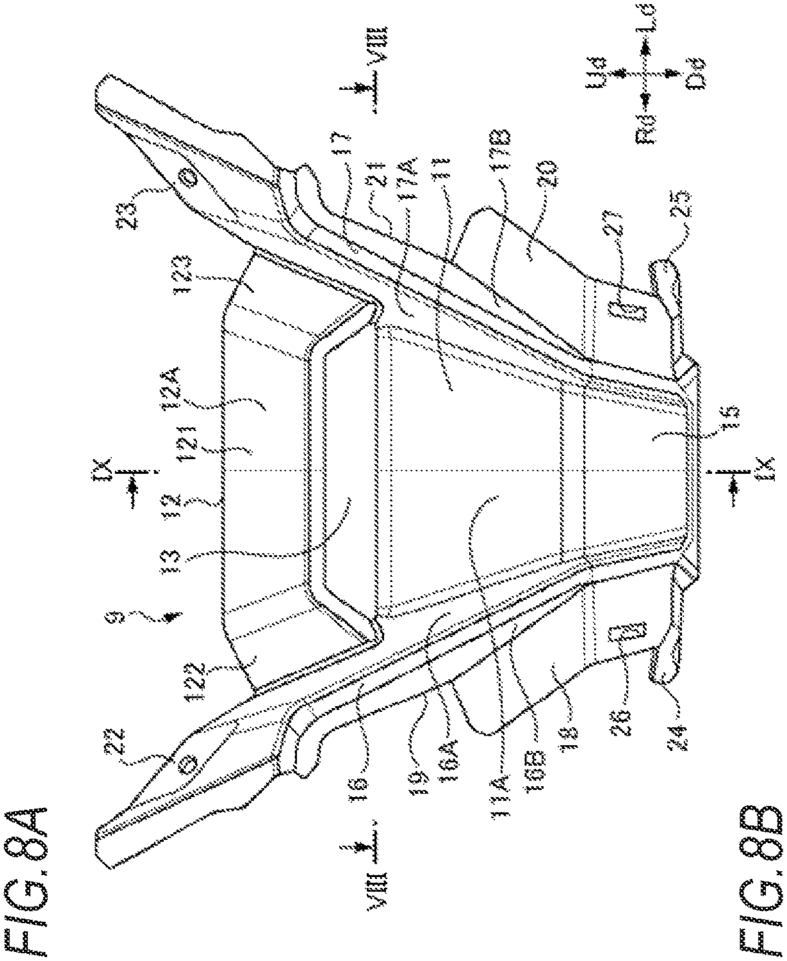
FIGS. 8A to 8D are illustrative diagrams showing the front wall portion of the under cowl according to the embodiment of the present invention.
Figure 8B:
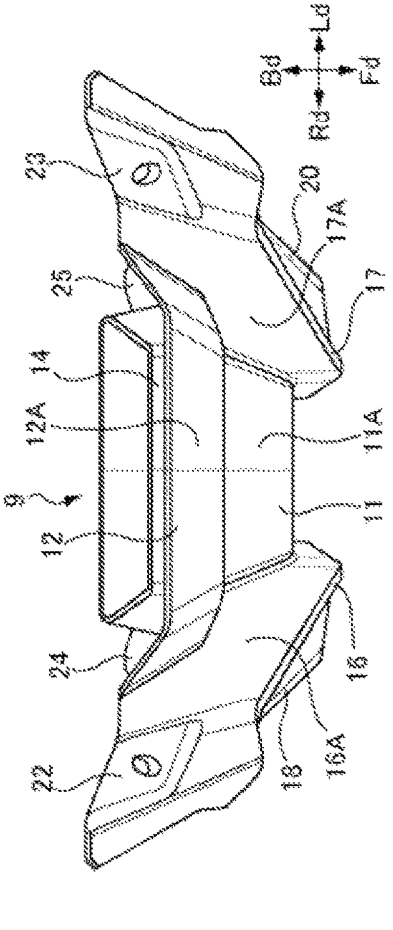
Figure 8C:
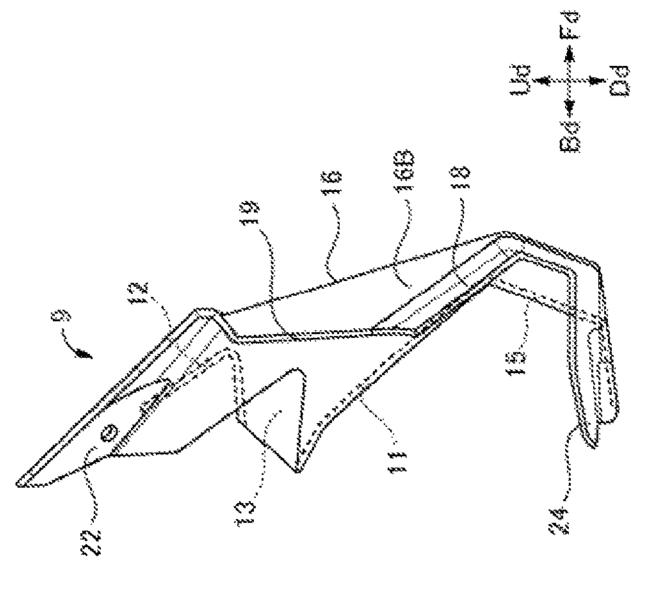
Figure 8D:
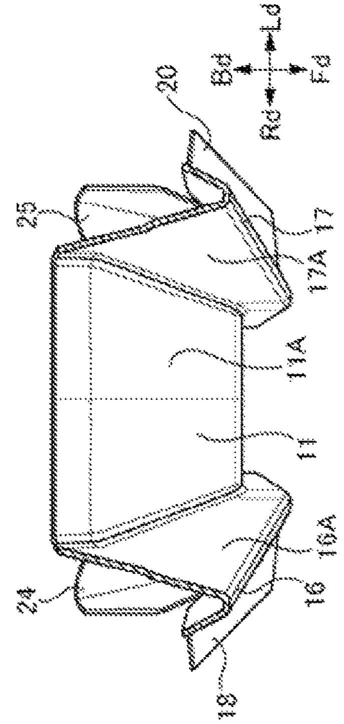
Figure 9:
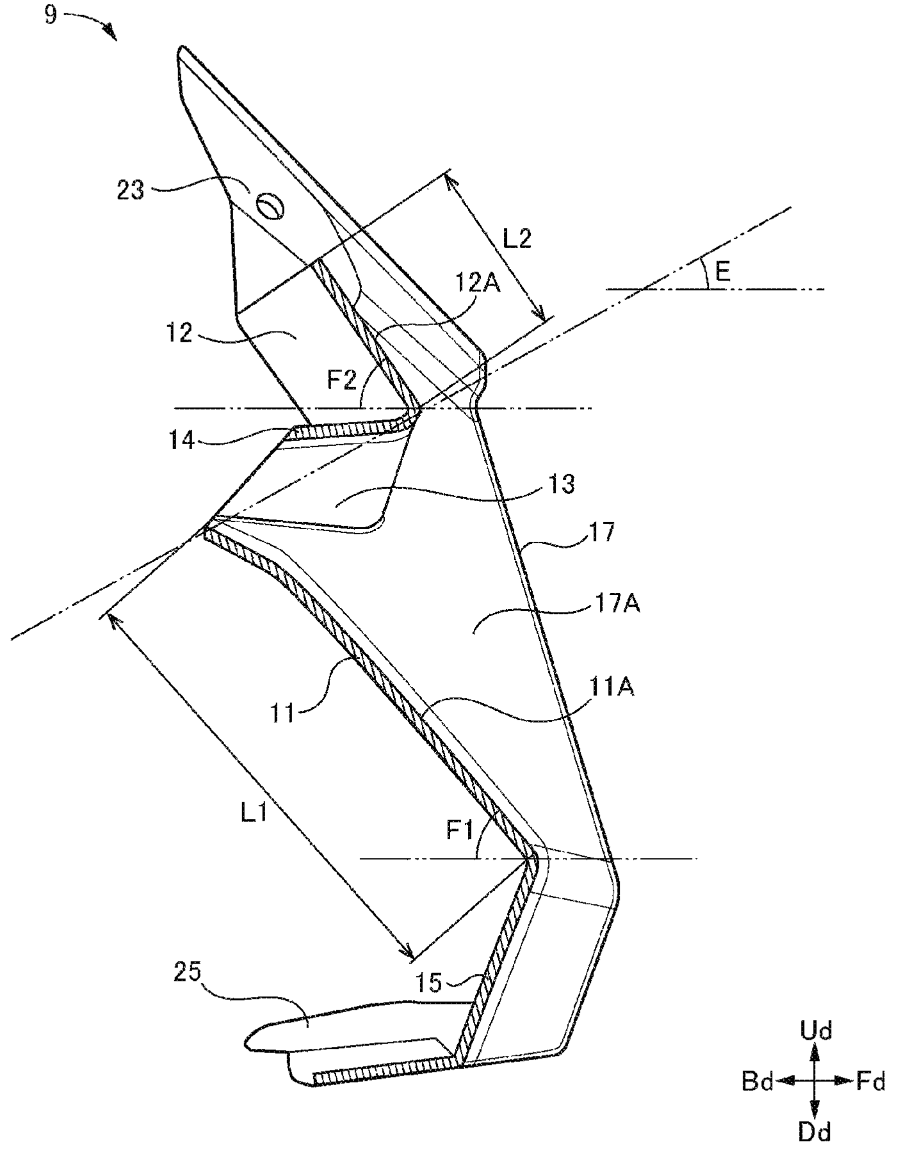
FIG. 9 is a cross-sectional view showing the front wall portion of the under cowl according to the embodiment of the present invention.
Figure 10A:
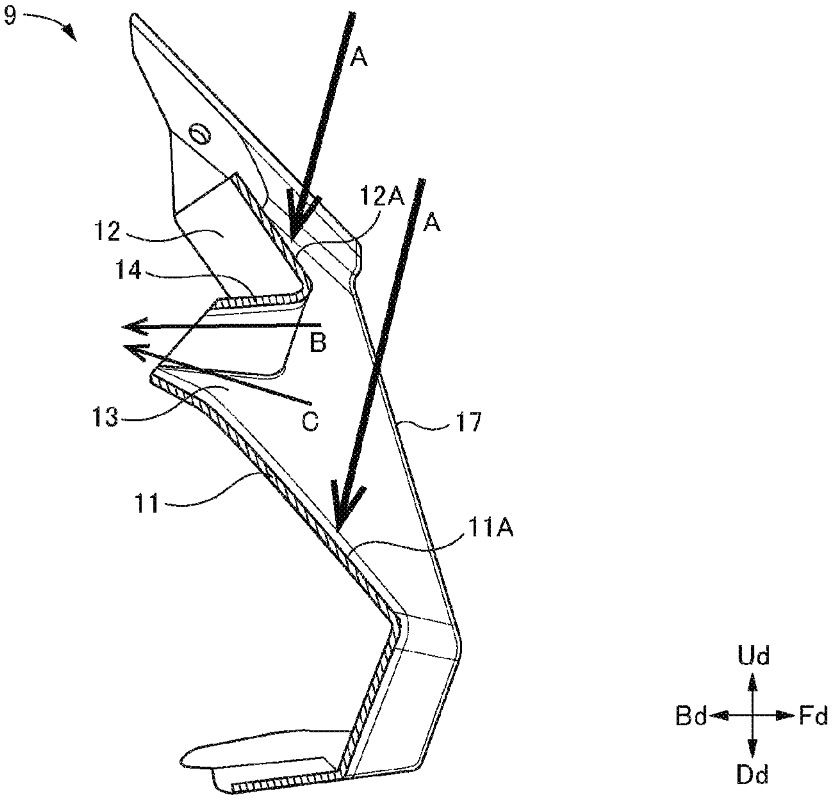
FIG. 10A and FIG. 10B are illustrative diagrams showing a traveling wind, water, mud, and the like that hit the front wall portion of the under cowl according to the embodiment of the present invention.
Figure 10B:
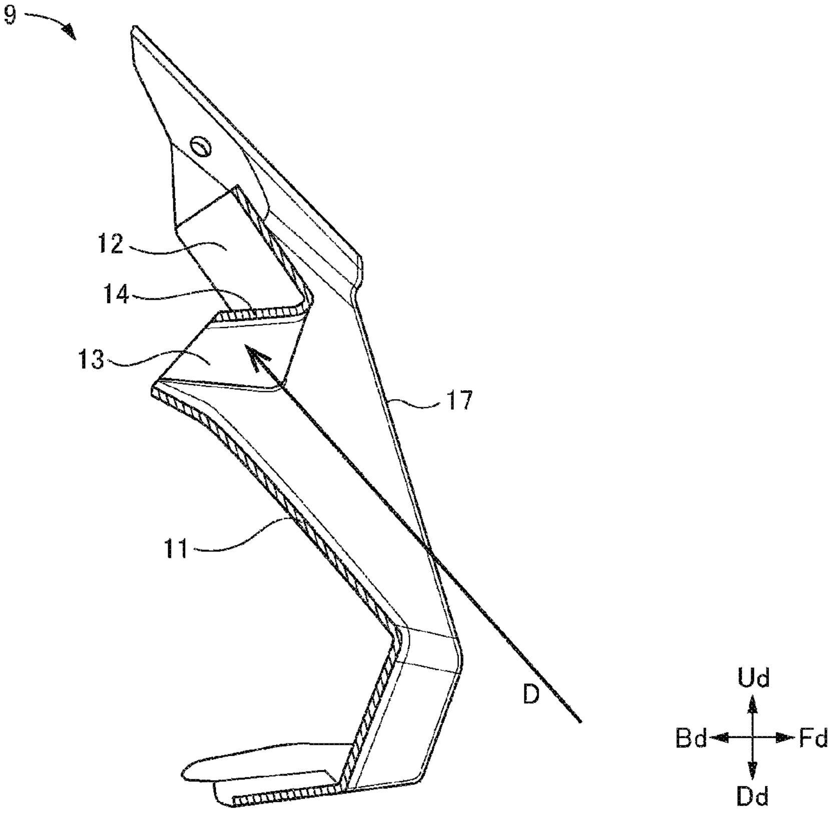

FIG. 4A shows the under cowl 6 when viewed from a front side. FIG. 4B shows a state where the exploded under cowl 6 is viewed from the front side. FIG. 5A shows the under cowl 6 when viewed from a rear side. FIG. 5B shows a state where the exploded under cowl 6 is viewed from the rear side. FIG. 6 shows the under cowl 6 when viewed from a right side. FIG. 7 shows a state where the front wall portion 9 of the under cowl 6 is viewed from an upper right front side. FIG. 8A shows the front wall portion 9 when viewed from a front side. FIG. 8B shows the front wall portion 9 when viewed from above. FIG. 8C shows the front wall portion 9 when viewed from a right side. FIG. 8D shows a state where a cross section of the front wall portion 9 taken along a cutting line VIII-VIII in FIG. 8A is viewed from above. FIGS. 9, 10A, and 10B show a state where a cross section of the front wall portion 9 taken along a cutting line IX-IX in FIG. 8A is viewed from a right side (a left side in FIG. 8A).

As shown in FIG. 6, the right wall portion 7 is formed in a substantially plate shape that extends in upper-lower and front-rear directions. In the present embodiment, the right wall portion 7 is integrally formed with the right side cowl 4 as described above. In a case where a boundary between the right wall portion 7 and the side cowl 4 is the broken line K1 in FIG. 1, when the straddle-type vehicle 1 is viewed from a side, the right wall portion 7 is formed in a substantially rectangle including an upper edge 7A, a front edge 7B, a rear edge 7C, and a lower edge 7D. The upper edge 7A is the boundary between the right wall portion 7 and the side cowl 4. When the straddle-type vehicle 1 is viewed from the side, the front edge 7B extends in a substantially perpendicular direction. When the straddle-type vehicle 1 is viewed from the side, the rear edge 7C is inclined such that a rear side is lower than a front side. In the present embodiment, the rear edge 7C has a shape having complicated irregularities for the purpose of avoiding an interference with other components and improving designability. When the straddle-type vehicle 1 is viewed from the side, the lower edge 7D extends in a substantially horizontal direction. Further, the left wall portion 8 is formed to be substantially bilaterally symmetrical to the right wall portion 7.

As shown in FIG. 8A, the front wall portion 9 of the under cowl 6 includes a first wind receiving plate 11, a second wind receiving plate 12, a central wall plate 15, a right protrusion 16, a left protrusion 17, a right end wall plate 18, a left end wall plate 20, an upper right connection portion 22, an upper left connection portion 23, a lower right connection portion 24, and a lower left connection portion 25, and further includes an inner wall plate 14 as shown in FIG. 9. For example, the front wall portion 9 is a resin molded product obtained by integrally forming these portions.

As shown in FIG. 7, the first wind receiving plate 11 is formed in a flat plate shape. The first wind receiving plate 11 includes a wind receiving surface 11A that receives a traveling wind that flows from an upper front side to a lower rear side of the front wall portion 9 as indicated by arrows A in FIG. 10A. An upper surface of the first wind receiving plate 11 is the wind receiving surface 11A. The wind receiving surface 11A extends in front-rear and left-right directions, and is inclined such that a front edge portion is lower than a rear edge portion. As described above, the wind receiving surface 11A extends in a direction in which the traveling wind that flows from the upper front side to the lower rear side of the front wall portion 9 is blocked.

As shown in FIG. 7, the second wind receiving plate 12 is formed in a plate shape whose portions on both left and right sides are bent. The second wind receiving plate 12 also includes a wind receiving surface 12A that receives the traveling wind that flows from the upper front side to the lower rear side of the front wall portion 9 as indicated by the arrows A in FIG. 10A. An upper surface of the second wind receiving plate 12 is a wind receiving surface 12A. The wind receiving surface 12A extends in the front-rear and left-right directions, and is inclined such that a front edge portion is lower than a rear edge portion. In this way, the wind receiving surface 12A extends in a direction in which the traveling wind that flows from the upper front side to the lower rear side of the front wall portion 9 is blocked. Further, as shown in FIG. 8A, an extending direction in the left-right direction of a central portion 121 of the wind receiving surface 12A in the left-right direction is horizontal. Further, a right end side portion 122 of the wind receiving surface 12A is inclined such that a right side is lower than a left side. Further, a left end side portion 123 of the wind receiving surface 12A is inclined such that a left side is lower than a right side.

As shown in FIG. 7, the second wind receiving plate 12 is disposed such that a front end portion of the second wind receiving plate 12 is on an upper side and a rear side with respect to a front end portion of the first wind receiving plate 11. Accordingly, the traveling wind that flows from the upper front side to the lower rear side of the front wall portion 9 hits both the wind receiving surface 11A of the first wind receiving plate 11 and the wind receiving surface 12A of the second wind receiving plate 12 as indicated by the arrows A in FIG. 10A.

A gap 13 is provided between the first wind receiving plate 11 and the second wind receiving plate 12. Due to the gap 13, a state is established in which a hole that penetrates the front wall portion 9 in the front-rear direction is opened in a portion between the first wind receiving plate 11 and the second wind receiving plate 12 in the front wall portion 9. The gap 13 causes inside and outside of the under cowl 6 to communicate with each other. As shown in FIG. 8A, the gap 13 extends in a left-right direction from a right end to a left end of a rear end portion of the first wind receiving plate 11, and has a shape elongated in the left-right direction. When the front wall portion 9 is viewed from a front side, an opening shape of the gap 13 is a trapezoidal shape whose lower base is longer than an upper base. During traveling of the straddle-type vehicle 1, a traveling wind that flows from a front side to a rear side of the front wall portion 9 as indicated by an arrow B in FIG. 10A, or a traveling wind that flows from a lower front side to an upper rear side of the front wall portion 9 as indicated by an arrow C in FIG. 10A flows into the under cowl 6 through the gap 13.

As shown in FIG. 9, the front end portion of the second wind receiving plate 12 is located on a front side with respect to the rear end portion of the first wind receiving plate 11. Specifically, positions of the front end portion of the second wind receiving plate 12 and the rear end portion of the first wind receiving plate 11 are set such that an inclination angle E of a straight line that passes through a rear end of the first wind receiving plate 11 and a front end of the second wind receiving plate 12 with respect to a horizontal direction is equal to or smaller than an inclination angle of a direction of the traveling wind that flows from the upper front side to the lower rear side of the front wall portion 9 with respect to the horizontal direction. In the present embodiment, the positions of the front end portion of the second wind receiving plate 12 and the rear end portion of the first wind receiving plate 11 are set to, for example, about 30 degrees such that the inclination angle E is significantly smaller than the inclination angle of the direction of the traveling wind that flows from the upper front side to the lower rear side of the front wall portion 9 with respect to the horizontal direction. Accordingly, the traveling wind that flows from the upper front side to the lower rear side of the front wall portion 9 as indicated by the arrows A in FIG. 10A is prevented from directly flowing into the under cowl 6 directly through the gap 13.

The front end portion of the second wind receiving plate 12 is located on an upper side with respect to the rear end portion of the first wind receiving plate 11. Accordingly, the traveling wind that flows from the front side to the rear side of the front wall portion 9 as indicated by the arrow B in FIG. 10A, or the traveling wind that flows from the lower front side to the upper rear side of the front wall portion 9 as indicated by the arrow C in FIG. 10A easily flows into the under cowl 6 directly through the gap 13. Therefore, an amount of the traveling wind that flows into the under cowl 6 via the gap 13 from the front side or the lower front side of the front wall portion 9 is increased.

As described above, in the front wall portion 9, the positions of the front end portion of the second wind receiving plate 12 and the rear end portion of the first wind receiving plate 11 are set such that the traveling wind that flows from the upper front side to the lower rear side of the front wall portion 9 is prevented from directly flowing into the gap 13, and on the other hand, the traveling wind that flows from the front side to the rear side of the front wall portion 9 or the traveling wind that flows from the lower front side to the upper rear side of the front wall portion 9 is promoted to flow into the gap 13. In other words, in the front wall portion 9, an orientation of the gap 13 is set such that the traveling wind that flows from the upper front side to the lower rear side of the front wall portion 9 is prevented from directly flowing into the gap 13, and the traveling wind that flows from the front side to the rear side of the front wall portion 9 or the traveling wind that flows from the lower front side to the upper rear side of the front wall portion 9 is promoted to flow into the gap 13.

As shown in FIG. 9, an area of the wind receiving surface 11A of the first wind receiving plate 11 is larger than an area of the wind receiving surface 12A of the second wind receiving plate 12. Further, a length L1 from a front edge to a rear edge of the wind receiving surface 11A of the first wind receiving plate 11 is larger than a length L2 from a front edge to a rear edge of the wind receiving surface 12A of the second wind receiving plate 12. In the present embodiment, the length L1 from the front edge to the rear edge of the wind receiving surface 11A of the first wind receiving plate 11 is more than twice the length L2 from the front edge to the rear edge of the wind receiving surface 12A of the second wind receiving plate 12. Further, an inclination angle F1 of the wind receiving surface 11A of the first wind receiving plate 11 with respect to the horizontal direction is smaller than an inclination angle F2 of the wind receiving surface 12A of the second wind receiving plate 12 with respect to the horizontal direction.

As shown in FIG. 10B, the inner wall plate 14 extends from a front end portion of the second wind receiving plate 12 to a lower rear side toward inside of the under cowl 6. Further, as shown in FIG. 8B, the inner wall plate 14 extends substantially in the left-right direction so as to be along the second wind receiving plate 12 from near a right end portion to near a left end portion of the second wind receiving plate 12. The inner wall plate 14 functions as a mudguard. That is, during traveling of the straddle-type vehicle 1, water, mud, sand, a pebble, and the like may be wound up by the front wheel 55. As indicated by an arrow D in FIG. 10B, the wound up water, mud, sand, pebble, and the like fly from the lower front side to the upper rear side of the front wall portion 9, and hit a lower surface of the inner wall plate 14. Accordingly, the wound up water, mud, sand, pebble, and the like are prevented from entering the under cowl 6 via the gap 13. The inner wall plate 14 shown in FIG. 10B extends from the front end portion to lower rear side of the second wind receiving plate 12, but the inner wall plate 14 may be caused to extend horizontally rearward from the front end portion of the second wind receiving plate 12. Even when the inner wall plate 14 is caused to extend horizontally rearward from the front end portion of the second wind receiving plate 12, effects of preventing the wound up water, mud, sand, pebble, and the like from entering the under cowl 6 via the gap 13 are obtained.

As shown in FIG. 7, the central wall plate 15 extends to a lower rear side from a lower end of the first wind receiving plate 11, and forms a wall of a central portion of a lower front portion of the under cowl 6.

The right protrusion 16 and the left protrusion 17 are provided on both sides of the first wind receiving plate 11, the second wind receiving plate 12, and the central wall plate 15 in the left-right direction. The right protrusion 16 and the left protrusion 17 extend in the upper-lower direction. Further, the right protrusion 16 and the left protrusion 17 are inclined such that a lower end is located on a front side with respect to an upper end. Further, as shown in FIG. 8B, a lower portion of each of the right protrusion 16 and the left protrusion 17 protrudes forward with respect to the first wind receiving plate 11 and the central wall plate 15, and an upper portion of each of the right protrusion 16 and the left protrusion 17 protrudes forward with respect to the second wind receiving plate 12. Further, as shown in FIG. 8A, the right protrusion 16 and the left protrusion 17 are inclined such that a lower end is located on a central side in the left-right direction with respect to an upper end. Further, as shown in FIGS. 8A and 8D, in the right protrusion 16, a portion from a front end portion thereof to the first wind receiving plate 11 and the second wind receiving plate 12 is an inner inclined portion 16A that extends rearward while being inclined leftward, and in the right protrusion 16, a portion from the front end portion thereof to the right end wall plate 18 is an outer inclined portion 16B that extends rearward while being inclined rightward. Further, in the left protrusion 17, a portion from a front end portion thereof to the first wind receiving plate 11 and the second wind receiving plate 12 is an inner inclined portion 17A that extends rearward while being inclined rightward, and in the left protrusion 17, a portion from the front end portion thereof to the right end wall plate 18 is an outer inclined portion 17B that extends rearward while being inclined leftward.

As shown in FIG. 8A, the right end wall plate 18 extends rightward from a right rear end portion of the right protrusion 16, and forms a wall of a boundary portion between the right wall portion 7 and the front wall portion 9. Further, the right end wall plate 18 extends substantially in the upper-lower direction while being bent. Specifically, as shown in FIG. 8C, an upper portion of the right end wall plate 18 extends substantially in a perpendicular direction, an intermediate portion of the right end wall plate 18 in the upper-lower direction is inclined such that a lower side is located on a front side with respect to an upper side, and a lower portion of the right end wall plate 18 is inclined such that a lower side is located on a rear side with respect to an upper side. Further, as shown in FIG. 8A, the upper portion of the right end wall plate 18 is provided with a cutout 19 for forming a right wind guide path 28 to be described later. Further, as shown in FIG. 5A, a right edge of the right end wall plate 18 is in contact with the right wall portion 7 except for a portion where the cutout 19 is provided.

The left end wall plate 20 extends leftward from a left rear end portion of the left protrusion 17, and forms a wall of a boundary portion between the left wall portion 8 and the front wall portion 9. The left end wall plate 20 is formed to be bilaterally symmetrical with the right end wall plate 18. Further, an upper portion of the left end wall plate 20 is provided with a cutout 21 for forming a left wind guide path 29 to be described later. Further, a left edge of the left end wall plate 20 is in contact with the left wall portion 8 except for a portion where the cutout 21 is provided.

As shown in FIG. 8A, an upper right end portion and a lower right end portion of the front wall portion 9 are provided with the upper right connection portion 22 and the lower right connection portion 24 for connecting the front wall portion 9 to the right wall portion 7, respectively. Further, an upper left end portion and a lower left end portion of the front wall portion 9 are provided with the upper left connection portion 23 and the lower left connection portion 25 for connecting the front wall portion 9 to the left wall portion 8, respectively. Further, in the front wall portion 9, locking holes 26 and 27 are provided in the lower portion of the right end wall plate 18 and a lower portion of the left end wall plate 20, respectively. Further, as shown in FIGS. 4B and 5B, an upper connection portion 31 and a lower connection portion 32 are provided at an upper portion and a lower portion of a front end side portion of the right wall portion 7, respectively. Further, a locking piece 33 and protruding pieces 34 are provided at a lower portion of a front end portion of the right wall portion 7. Further, an upper connection portion 35 and a lower connection portion 36 are also provided at an upper portion and a lower portion of a front end side portion of the left wall portion 8, respectively. Further, a locking piece 37 and protruding pieces 38 are also provided at a lower portion of a front end portion of the left wall portion 8. As shown in FIGS. 4A and 5A, the front wall portion 9 and the right wall portion 7 are connected to each other by inserting the locking piece 33 of the right wall portion 7 into the locking hole 26 of the front wall portion 9, inserting a right edge portion of the right end wall plate 18 of the front wall portion 9 between a front edge portion of a lower portion of the right wall portion 7 and the protruding pieces 34, coupling the upper right connection portion 22 of the front wall portion 9 to the upper connection portion 31 of the right wall portion 7 by using a fixing member 41, and coupling the lower right connection portion 24 of the front wall portion 9 to the lower connection portion 32 of the right wall portion 7 by using a fixing member 42. Further, the front wall portion 9 and the left wall portion 8 are connected to each other by inserting the locking piece 37 of the left wall portion 8 into the locking hole 27 of the front wall portion 9, inserting a left edge portion of the left end wall plate 20 of the front wall portion 9 between a front edge portion of a lower portion of the left wall portion 8 and the protruding pieces 38, coupling the upper left connection portion 23 of the front wall portion 9 to the upper connection portion 35 of the left wall portion 8 by using a fixing member 43, and coupling the lower left connection portion 25 of the front wall portion 9 to the lower connection portion 36 of the left wall portion 8 by using a fixing member 44. As the fixing members 41 to 44, for example, rivets or screws can be used.

Figure 11:
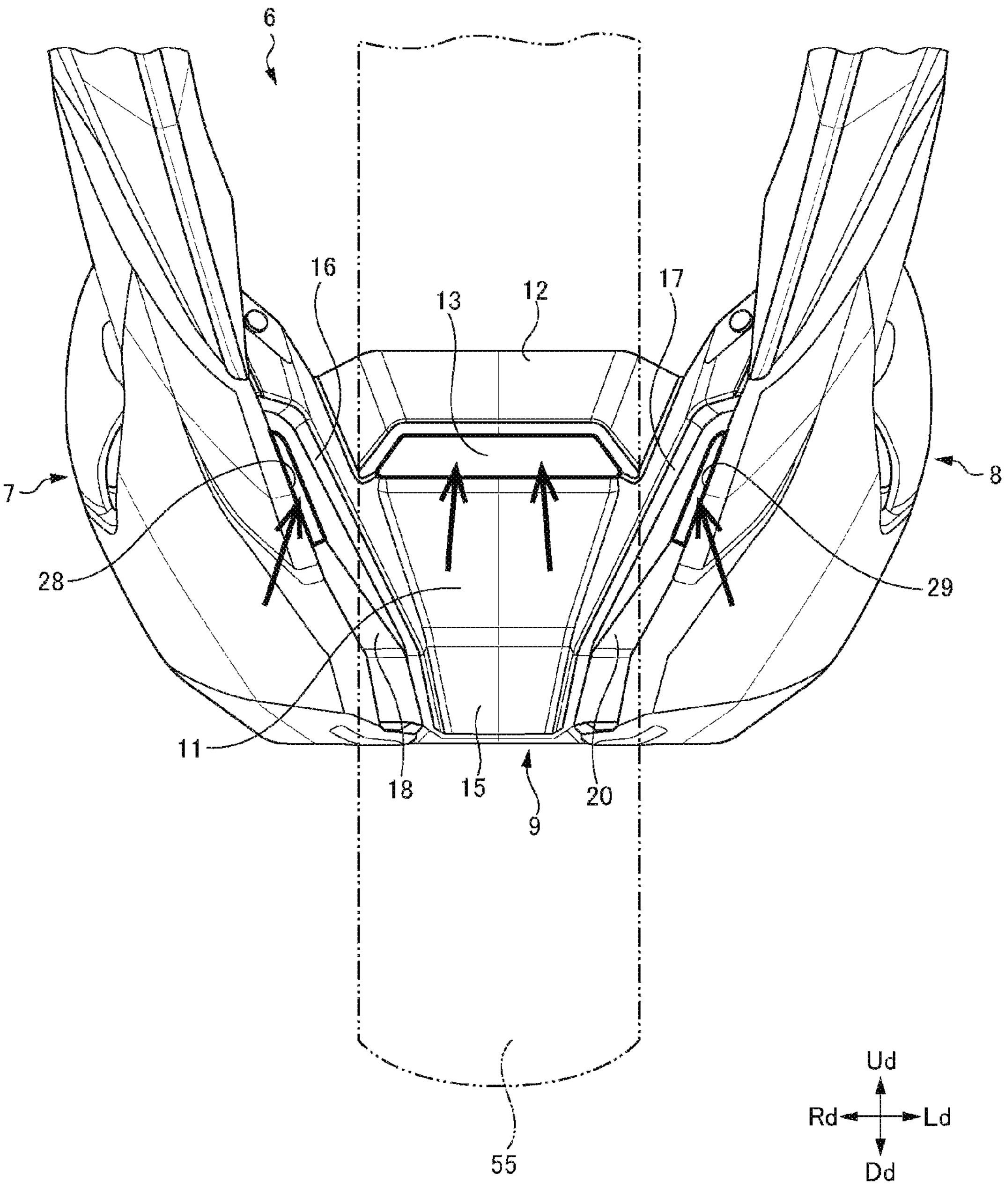
FIG. 11 is an illustrative diagram showing a positional relationship between the under cowl according to the embodiment of the present invention and a front wheel.

FIG. 11 shows the under cowl 6 when viewed from the front side. Further, in FIG. 11, an outer shape of the front wheel 55 is indicated by a two-dot chain line. As shown in FIG. 11, in the front wall portion 9, the right wind guide path 28 and the left wind guide path 29 are provided at a portion on a right side with respect to the right protrusion 16 and a portion on a left side with respect to the left protrusion 17, respectively. The right wall portion 7 and the front wall portion 9 are connected to each other, whereby a vertically elongated hole that is opened forward and causes outside and inside of the under cowl 6 to communicate with each other is formed between the cutout 19 provided in the right end wall plate 18 of the front wall portion 9 and a front portion of the right wall portion 7. The hole is the right wind guide path 28. Further, the left wall portion 8 and the front wall portion 9 are connected to each other, whereby a vertically elongated hole that is opened forward and causes the outside and the inside of the under cowl 6 to communicate with each other is formed between the cutout 21 provided in the left end wall plate 20 of the front wall portion 9 and a front portion of the left wall portion 8. The hole is the left wind guide path 29.

While the gap 13 between the first wind receiving plate 11 and the second wind receiving plate 12 in the front wall portion 9 is located directly behind the front wheel 55, the right wind guide path 28 is located on a right side with respect to the front wheel 55, and the left wind guide path 29 is located on a left side with respect to the front wheel 55. Further, when the front wall portion 9 is viewed from a right side, as shown in FIG. 8C, the cutout 19 formed in the right end wall plate 18 of the front wall portion 9 is disposed on a front side with respect to the gap 13 between the first wind receiving plate 11 and the second wind receiving plate 12. Therefore, the right wind guide path 28 is located on a front side with respect to the gap 13 between the first wind receiving plate 11 and the second wind receiving plate 12. Similarly, the left wind guide path 29 is located on a front side with respect to the gap 13 between the first wind receiving plate 11 and the second wind receiving plate 12.

The right wind guide path 28 and the left wind guide path 29 are paths through each of which the traveling wind that flows from the front side to the rear side of the under cowl 6 is introduced into the under cowl 6. That is, as paths that cause the traveling wind to flow in from the outside to the inside of the under cowl 6, the under cowl 6 includes the right wind guide path 28 and the left wind guide path 29 in addition to the gap 13 between the first wind receiving plate 11 and the second wind receiving plate 12 of the front wall portion 9. The gap 13 between the first wind receiving plate 11 and the second wind receiving plate 12 has an opening area (a flow path area of the traveling wind) larger than those of the right wind guide path 28 and the left wind guide path 29. From this point of view, the gap 13 between the first wind receiving plate 11 and the second wind receiving plate 12 can cause a larger amount of traveling wind to flow into the under cowl 6 than the right wind guide path 28 and the left wind guide path 29. On the other hand, while the gap 13 between the first wind receiving plate 11 and the second wind receiving plate 12 is located directly behind the front wheel 55, the right wind guide path 28 and the left wind guide path 29 are located on a right side and a left side with respect to the front wheel 55, respectively. Therefore, when the traveling wind from the front side of the straddle-type vehicle 1 hits the front wheel 55 and spreads to left and right sides, the traveling wind flows more easily into the right wind guide path 28 and the left wind guide path 29 than the gap 13 between the first wind receiving plate 11 and the second wind receiving plate 12. The gap 13 between the first wind receiving plate 11 and the second wind receiving plate 12 is combined with the right wind guide path 28 and the left wind guide path 29, whereby the traveling wind can be made to reliably flow into the under cowl 6.

As shown in FIG. 6, the front wall portion 9 is disposed on a rear side with respect to the front edge 7B of the right wall portion 7 and a front edge of the left wall portion 8. That is, each of the first wind receiving plate 11, the second wind receiving plate 12, the gap 13, the central wall plate 15, the right end wall plate 18, the left end wall plate 20, the right wind guide path 28, and the left wind guide path 29 is entirely located on a rear side with respect to the front edge 7B of the right wall portion 7 and the front edge of the left wall portion 8. When the straddle-type vehicle 1 is viewed from the right side, the front wall portion 9 is hidden by the right wall portion 7 except for a part of the right protrusion 16. Similarly, when the straddle-type vehicle 1 is viewed from a left side, the front wall portion 9 is hidden by the left wall portion 8 except for a part of the left protrusion 17. That is, the front portion of the right wall portion 7 covers substantially the entire front wall portion 9 from a right side, and the front portion of the left wall portion 8 covers substantially the entire front wall portion 9 from the left side. As a result, the entire first wind receiving plate 11 and the entire second wind receiving plate 12 are covered by the front portion of the right wall portion 7 from the right side and covered by the front portion of the left wall portion 8 from the left side. As indicated by the arrows A in FIG. 10A, the traveling wind that flows from the upper front side to the lower rear side of the front wall portion 9 hits the wind receiving surface 11A of the first wind receiving plate 11 and the wind receiving surface 12A of the second wind receiving plate 12 of the front wall portion 9 after entering a space between the front portion of the right wall portion 7 and the front portion of the left wall portion 8.

As described above, according to the under cowl 6 of the embodiment of the present invention, when the traveling wind that flows from the upper front side to the lower rear side of the front wall portion 9 is received by the wind receiving surface 11A of the first wind receiving plate 11 and the wind receiving surface 12A of the second wind receiving plate 12, a large downforce can be generated, and a traveling posture of the straddle-type vehicle 1 can be stabilized. That is, during traveling of the straddle-type vehicle 1, a part of the traveling wind that flows from the front side of the straddle-type vehicle 1 toward the straddle-type vehicle 1 passes through a space between the lower surface 2B of the front cowl 2 and the upper surface of the front fender 56. The traveling wind that passes through the space between the lower surface 2B of the front cowl 2 and the upper surface of the front fender 56 changes an orientation to the lower rear side so as to be along the front fender 56, or hits a front surface of the radiator 65 and changes the orientation to the lower rear side, and flows from the upper front side to the lower rear side of the front wall portion 9 of the under cowl 6. In the under cowl 6, the wind receiving surface 11A of the first wind receiving plate 11 and the wind receiving surface 12A of the second wind receiving plate 12 extend in the front-rear and left-right directions, and are inclined such that the front edge portion is lower than the rear edge portion. As described above, both of the wind receiving surfaces 11A and 12A extend in the direction in which the traveling wind that flows from the upper front side to the lower rear side of the front wall portion 9 of the under cowl 6 is blocked. Further, the second wind receiving plate 12 is disposed such that the front end portion of the second wind receiving plate 12 is on an upper side and a rear side with respect to the front end portion of the first wind receiving plate 11. Since the second wind receiving plate 12 is disposed as described above, the traveling wind that flows from the upper front side to the lower rear side of the front wall portion 9 hits the wind receiving surface 11A of the first wind receiving plate 11 and the wind receiving surface 12A of the second wind receiving plate 12. Therefore, according to the under cowl 6, the traveling wind, which passes through the space between the lower surface 2B of the front cowl 2 and the upper surface of the front fender 56 and changes the orientation to the lower rear side so as to be along the front fender 56, can be received by the wind receiving surface 11A of the first wind receiving plate 11 and the wind receiving surface 12A of the second wind receiving plate 12. Accordingly, as compared with a related-art under cowl including no such a wind receiving surface, a large downforce can be generated, and front lift of the straddle-type vehicle 1 can be prevented. Therefore, a traveling posture of a vehicle can be stabilized.

According to the under cowl 6 of the present embodiment, the traveling wind is caused to flow into the under cowl 6 via the gap 13 between the first wind receiving plate 11 and the second wind receiving plate 12, whereby heat accumulation in the under cowl 6 can be prevented. That is, the inside and the outside of the under cowl 6 communicate with each other via the gap 13 between the first wind receiving plate 11 and the second wind receiving plate 12. During traveling of the straddle-type vehicle 1, the traveling wind that flows from the front side to the rear side of the front wall portion 9, or the traveling wind that flows from the lower front side to the upper rear side of the front wall portion 9 flows into the under cowl 6 from the outside via the gap 13. High-temperature air in the under cowl 6 can be pushed out to the outside of the under cowl 6, for example, below or behind the under cowl 6 by the traveling wind. Accordingly, heat generated from a heat generating body such as the engine 60 and the exhaust pipe 66 can be prevented from being accumulated in the under cowl 6, and a temperature rise in the engine 60 and the like can be prevented.

Since the gap 13 between the first wind receiving plate 11 and the second wind receiving plate 12 is at the substantially middle position of the under cowl 6 in the upper-lower direction, high-temperature air in the under cowl 6 can be efficiently pushed out to the outside of the under cowl 6 by the traveling wind that flows into the under cowl 6 from the gap 13. Further, since the gap 13 is at a position higher than a lowermost portion of the under cowl 6, water, mud, sand, a pebble, and the like can be prevented from entering the under cowl 6 via the gap 13. Further, since the gap 13 is at a position on a rear side with respect to a foremost portion of the under cowl 6, the gap 13 can be separated from the front wheel 55. Accordingly, the traveling wind that flows from the front side to the rear side of the front wall portion 9 or the traveling wind that flows from the lower front side to the upper rear side of the front wall portion 9 can be promoted to flow into the gap 13, and an amount of the traveling wind that flows into the under cowl 6 can be increased.

In the front wall portion 9 of the under cowl 6 according to the present embodiment, the front end portion of the second wind receiving plate 12 is located on the front side and the upper side with respect to the rear end portion of the first wind receiving plate 11. With this configuration, the traveling wind that flows from the upper front side to the lower rear side of the front wall portion 9 can be prevented from directly flowing into the gap 13. On the other hand, the traveling wind that flows from the front side to the rear side of the front wall portion 9 or the traveling wind that flows from the lower front side to the upper rear side of the front wall portion 9 can be promoted to flow into the gap 13. The traveling wind that flows from the upper front side to the lower rear side of the front wall portion 9 is prevented from directly flowing into the gap 13, whereby the traveling wind that flows from the upper front side to the lower rear side of the front wall portion 9 can be prevented from directly flowing into the gap 13, passing through the under cowl 6 subsequently, and being discharged to the lower side of the under cowl 6. Accordingly, the downforce generated by the traveling wind that flows from the upper front side to the lower rear side of the front wall portion 9 can be prevented from decreasing. On the other hand, the traveling wind that flows from the front side to the rear side of the front wall portion 9 or the traveling wind that flows from the lower front side to the upper rear side of the front wall portion 9 is promoted to flow into the gap 13, whereby it is possible to increase an amount of the traveling wind that passes through the gap 13 from the front side or the lower front side of the front wall portion 9 and flows into the under cowl 6. Accordingly, effects of preventing the heat accumulation in the under cowl 6 can be improved.

In the front wall portion 9 of the under cowl 6 according to the present embodiment, the inclination angle of the wind receiving surface 11A of the first wind receiving plate 11 with respect to the horizontal direction is smaller than the inclination angle of the wind receiving surface 12A of the second wind receiving plate 12 with respect to the horizontal direction. Accordingly, it is possible to improve effects of preventing the front lift while reducing a dimension of the front wall portion 9 in the front-rear direction. The reason for this will be described. In order to understand the reason for this, it is necessary to consider the following three points.

(1) When a direction of a traveling wind and a wind receiving surface are orthogonal to each other, a force of the traveling wind pressing the wind receiving surface is the maximum. Therefore, in order to increase the downforce generated by receiving the traveling wind that flows from the upper front side to the lower rear side of the front wall portion 9 by the wind receiving surface 11A of the first wind receiving plate 11 and the wind receiving surface 12A of the second wind receiving plate 12, it is preferable that an angle of each of the wind receiving surface 11A and the wind receiving surface 12A be close to 90 degrees with respect to a direction of the traveling wind that flows from the upper front side to the lower rear side of the front wall portion 9.

(2) A direction of the traveling wind that passes through the space between the lower surface 2B of the front cowl 2 and the upper surface of the front fender 56 and flows to the lower rear side so as to be along the front fender 56, that is, the traveling wind that flows from the upper front side to the lower rear side of the front wall portion 9 is a direction close to perpendicular than horizontal, that is, a direction exceeding 45 degrees with respect to the horizontal direction.

(3) Front lift generated during acceleration of the straddle-type vehicle 1 is generally a phenomenon in which a front wheel is lifted up using a rear wheel that is a driving wheel as a fulcrum. Therefore, in order to improve the effects of preventing the front lift, it is preferable that a place where the downforce is generated is as close as possible to the front end of the straddle-type vehicle.

In view of the first and second points described above, it is preferable that the inclination angles of the wind receiving surfaces 11A and 12A be 45 degrees or less with respect to the horizontal direction. When the inclination angles of the wind receiving surfaces 11A and 12A are set to 45 degrees or less with respect to the horizontal direction, a dimension of the front wall portion 9 in the front-rear direction may increase, the lower end of the front wall portion 9 may come into contact with the front wheel 55, and the upper end of the front wall portion 9 may come into contact with the exhaust pipe 66. Therefore, an inclination angle of any one of the wind receiving surfaces 11A and 12A is made close to 45 degrees with respect to the horizontal direction, and an inclination angle of the other wind receiving surface with respect to the horizontal direction is made larger than an inclination angle of one wind receiving surface with respect to the horizontal direction. Accordingly, it is possible to increase the downforce while reducing the dimension of the front wall portion 9 in the front-rear direction. Further, by making the inclination angle of the wind receiving surface 11A disposed at a front side portion of the front wall portion 9 closer to 45 degrees with respect to the horizontal direction than the inclination angle of the wind receiving surface 12A disposed at the rear side portion of the front wall portion 9, a downforce generated by the front side portion of the front wall portion 9 can be made larger than a downforce generated by the rear side portion of the front wall portion 9, and a place where the large downforce is generated can be made close to the front end of the straddle-type vehicle 1. Accordingly, in view of the third point described above, the effects of preventing the front lift can be improved. As described above, the inclination angle of the wind receiving surface 11A of the first wind receiving plate 11 with respect to the horizontal direction is made smaller than the inclination angle of the wind receiving surface 12A of the second wind receiving plate 12 with respect to the horizontal direction, whereby it is possible to improve the effects of preventing the front lift while reducing the dimension of the front wall portion 9 in the front-rear direction.

In the front wall portion 9 of the under cowl 6 according to the present embodiment, the inclination angle of the wind receiving surface 11A of the first wind receiving plate 11 with respect to the horizontal direction is smaller than the inclination angle of the wind receiving surface 12A of the second wind receiving plate 12 with respect to the horizontal direction, and the area of the wind receiving surface 11A of the first wind receiving plate 11 is larger than the area of the wind receiving surface 12A of the second wind receiving plate 12. Accordingly, the downforce generated by the front side portion of the front wall portion 9 can be increased, and the effects of preventing the front lift can be further improved.

In the front wall portion 9 of the under cowl 6 according to the present embodiment, the length from the front edge to the rear edge of the wind receiving surface 11A of the first wind receiving plate 11 is larger than the length from the front edge to the rear edge of the wind receiving surface 12A of the second wind receiving plate 12. Accordingly, even when the length of the wind receiving surface 11A of the first wind receiving plate 11 in the left-right direction is smaller than the length of the wind receiving surface 12A of the second wind receiving plate 12 in the left-right direction, the area of the wind receiving surface 11A of the first wind receiving plate 11 can be made larger than the area of the wind receiving surface 12A of the second wind receiving plate 12. Further, the position of the gap 13 between the first wind receiving plate 11 and the second wind receiving plate 12 can be set at the portion on the rear side of the front wall portion 9, and the gap 13 can be largely separated from the front wheel 55. Accordingly, the traveling wind from the front side or the lower front side of the front wall portion 9 can be further promoted to flow into the under cowl 6 via the gap 13.

The front wall portion 9 of the under cowl 6 according to the present embodiment includes the inner wall plate 14 that extends downward and rearward from the front end portion of the second wind receiving plate 12 toward the inside of the under cowl 6. Accordingly, water, mud, sand, a pebble, and the like wound up by the front wheel 55 can be prevented from entering the under cowl 6 via the gap 13.

In the front wall portion 9 of the under cowl 6 according to the present embodiment, the right protrusion 16 and the left protrusion 17 are provided at both sides of the first wind receiving plate 11 and the second wind receiving plate 12 in the left-right direction, and the right wind guide path 28 and the left wind guide path 29 are provided at the portion on the right side with respect to the right protrusion 16 and the portion on the left side with respect to the left protrusion 17. Since the right wind guide path 28 and the left wind guide path 29 are provided in addition to the gap 13 between the wind receiving surfaces 11A and 12A, the traveling wind can be caused to reliably flow into the under cowl 6, and the effects of preventing the heat accumulation in the under cowl 6 can be improved. Further, the right protrusion 16 and the left protrusion 17 have a function of partitioning a first traveling wind that passes through the space between the lower surface 2B of the front cowl 2 and the upper surface of the front fender 56 and flows to the lower rear side so as to be along the front fender 56 from a second traveling wind that passes through a right side and a left side of the front wheel 55 from the front side of the straddle-type vehicle 1 and flows to the rear side. With this function, it is possible to generate the downforce by receiving the first traveling wind by the wind receiving surfaces 11A and 12A, and to prevent the heat accumulation in the under cowl 6 by causing the second traveling wind to flow into the under cowl 6 via the right wind guide path 28 and the left wind guide path 29.

In the under cowl 6 according to the present embodiment, the entire first wind receiving plate 11 and the entire second wind receiving plate 12 are covered by the front portion of the right wall portion 7 from the right side and by the front portion of the left wall portion 8 from the left side. With this configuration, an amount of the traveling wind that hits the wind receiving surface 11A of the first wind receiving plate 11 and the wind receiving surface 12A of the second wind receiving plate 12 from the upper front side of the front wall portion 9 can be increased, and the downforce can be increased. That is, in the under cowl 6, the traveling wind that passes through the space between the lower surface 2B of the front cowl 2 and the upper surface of the front fender 56 enters a space between a front portion of the side cowl 4 and a front portion of the side cowl 5, and changes the orientation to the lower rear side. Thereafter, the traveling wind flows to the lower rear side between the front portion of the side cowl 4 and the front portion of the side cowl 5, enters a space between the front portion of the right wall portion 7 and the front portion of the left wall portion 8 of the under cowl 6, and then hits the wind receiving surfaces 11A and 12A. According to the under cowl 6 of the present embodiment, the traveling wind that flows from the upper front side to the lower rear side of the front wall portion 9 can be prevented from spreading in the left-right direction by the front portion of the right wall portion 7 and the front portion of the left wall portion 8, and the traveling wind that flows from the upper front side to the lower rear side of the front wall portion 9 can be collected above the wind receiving surfaces 11A and 12A. Therefore, the amount of the traveling wind that hits the wind receiving surfaces 11A and 12A can be increased, and the downforce can be increased.

Figure 12A:
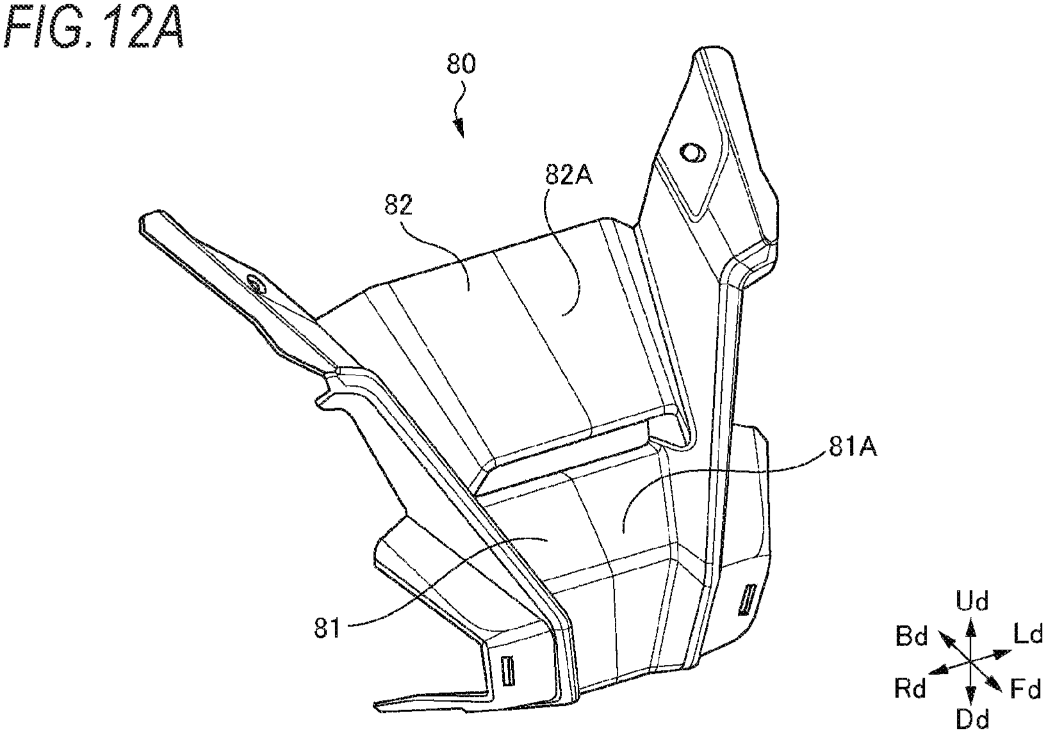
FIG. 12A and FIG. 12B are illustrative diagrams showing other embodiments of the under cowl according to the present invention.

As in a front wall portion 80 of an under cowl shown in FIG. 12A, an inclination angle of a wind receiving surface 82A of a second wind receiving plate 82 disposed at an upper side portion of the front wall portion 80 with respect to a horizontal direction may be smaller than an inclination angle of a wind receiving surface 81A of a first wind receiving plate 81 disposed at a lower side portion of the front wall portion 80 with respect to the horizontal direction. Further, as shown in FIG. 12A, an area of the wind receiving surface 82A of the second wind receiving plate 82 may be made larger than an area of the wind receiving surface 81A of the first wind receiving plate 81. Further, as shown in FIG. 12A, a length from a front edge to a rear edge of the wind receiving surface 82A of the second wind receiving plate 82 may be made larger than a length from a front edge to a rear edge of the wind receiving surface 81A of the first wind receiving plate 81.

Figure 12B:
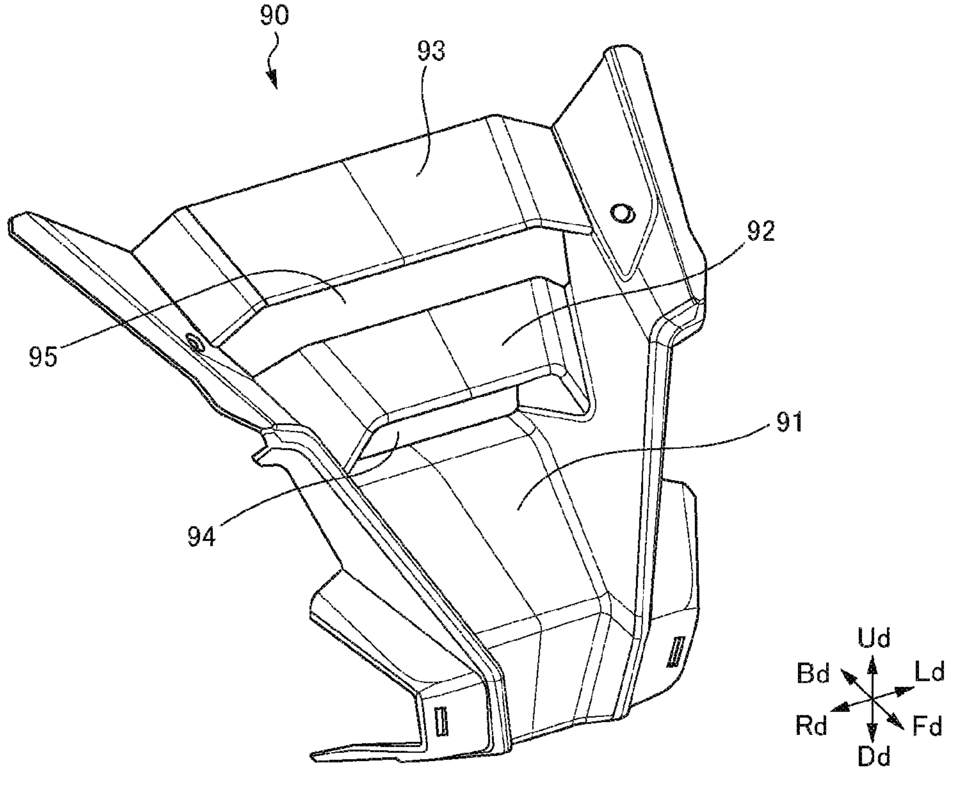

As in a front wall portion 90 of an under cowl shown in FIG. 12B, a third wind receiving plate 93 may be provided in addition to a first wind receiving plate 91 and a second wind receiving plate 92. The third wind receiving plate 93 is disposed such that a front end portion thereof is on an upper side and a rear side with respect to a front end portion of the second wind receiving plate 92. Further, a gap 94 is provided between the first wind receiving plate 91 and the second wind receiving plate 92, and a gap 95 is also provided between the second wind receiving plate 92 and the third wind receiving plate 93.

The under cowl 6 according to the embodiment described above covers the portion extending from immediately behind the front wheel 55 to the lower portion of the power unit 59 in the straddle-type vehicle 1. However, the under cowl according to the present invention may be an under cowl that covers a portion from immediately behind the front wheel to immediately in front of the lower portion of the power unit in the straddle-type vehicle, or may be an under cowl that covers a portion from immediately behind the front wheel to immediately in front of the rear wheel in the straddle-type vehicle. Further, a lower wall portion that covers the lower portion of the power unit 59 from below may be added to the under cowl 6 according to the embodiment described above.

The present invention can also be applied to a straddle-type vehicle other than a full-cowl-type straddle-type vehicle, for example, a straddle-type vehicle only including an under cowl. Further, the present invention can also be applied to a straddle-type vehicle including a power source other than an internal combustion engine.

The present invention can be appropriately changed without departing from the gist or concept of the invention which can be read from the claims and the entire description, and an under cowl accompanied with such a change is also included in the technical concept of the present invention.

What is claimed is:

1. An under cowl that is provided at a straddle-type vehicle including a front wheel, a rear wheel, and a power unit provided between the front wheel and the rear wheel, and that covers a portion on a rear side of the front wheel and a lower portion front side of the power unit in the straddle-type vehicle, the under cowl comprising:

a right wall portion;

a left wall portion; and a front wall portion, wherein the front wall portion includes a first wind receiving plate including a wind receiving surface that extends in front-rear and left-right directions, that is inclined such that a front edge portion is lower than a rear edge portion, and that receives a traveling wind that flows from an upper front side to a lower rear side of the front wall portion, and a second wind receiving plate including a wind receiving surface that extends in front-rear and left-right directions, that is inclined such that a front edge portion is lower than a rear edge portion, and that receives the traveling wind, the second wind receiving plate is disposed such that a front end portion thereof is on an upper side and a rear side with respect to a front end portion of the first wind receiving plate, and a gap is provided between the first wind receiving plate and the second wind receiving plate, an inclination angle of the wind receiving surface of the first wind receiving plate with respect to a horizontal direction is smaller than an inclination angle of the wind receiving surface of the second wind receiving plate with respect to the horizontal direction.

2. The under cowl according to claim 1, wherein a front end portion of the second wind receiving plate is located on a front side with respect to a rear end portion of the first wind receiving plate.

3. The under cowl according to claim 1, wherein an area of the wind receiving surface of the first wind receiving plate is larger than an area of the wind receiving surface of the second wind receiving plate.

4. The under cowl according to claim 3, wherein a length from a front edge to a rear edge of the wind receiving surface of the first wind receiving plate is larger than a length from a front edge to a rear edge of the wind receiving surface of the second wind receiving plate.

5. The under cowl according to claim 1, wherein the front wall portion includes an inner wall plate that extends from a front end portion of the second wind receiving plate to a rear side or a lower rear side toward inside of the under cowl.

6. The under cowl according to claim 1, wherein the first wind receiving plate and the second wind receiving plate are covered by the right wall portion from a right side and by the left wall portion from a left side.

7. The under cowl according to claim 1, wherein positions of the front end portion of the second wind receiving plate and the rear end portion of the first wind receiving plate are set so that an inclination angle of a straight line that passes through a rear end of the first wind receiving plate and a front end of the second wind receiving plate with respect to the horizontal direction is equal to or smaller than an inclination angle of a direction of the traveling wind that flows from the upper front side to the lower rear side of the front wall portion with respect to the horizontal direction.

8. The under cowl according to claim 7, wherein the inclination angle of the straight line that passes through the rear end of the first wind receiving plate and the front end of the second wind receiving plate with respect to the horizontal direction is set to 30 degrees or less.

9. The under cowl according to claim 1, wherein the second wind receiving plate is formed in a plate shape whose portions on both left and right sides are bent, and an extending direction in the left-right direction of a central portion of the wind receiving surface of the second wind receiving plate in the left-right direction is horizontal, and a right end side portion of the wind receiving surface of the second wind receiving plate is inclined so that a right side is lower than a left side, and a left end side portion of the wind receiving surface of the second wind receiving plate is inclined so that a left side is lower than a right side.

10. The under cowl according to claim 4, wherein the length from the front edge to the rear edge of the wind receiving surface of the first wind receiving plate is more than twice as the length from the front edge to the rear edge of the wind receiving surface of the second wind receiving plate.

11. An under cowl that is provided at a straddle-type vehicle including a front wheel, a rear wheel, and a power unit provided between the front wheel and the rear wheel, and that covers a portion on a rear side of the front wheel and a lower portion front side of the power unit in the straddle-type vehicle, the under cowl comprising:

a right wall portion;

a left wall portion; and a front wall portion, wherein the front wall portion includes a first wind receiving plate including a wind receiving surface that extends in front-rear and left-right directions, that is inclined such that a front edge portion is lower than a rear edge portion, and that receives a traveling wind that flows from an upper front side to a lower rear side of the front wall portion, a second wind receiving plate including a wind receiving surface that extends in front-rear and left-right directions, that is inclined such that a front edge portion is lower than a rear edge portion, and that receives the traveling wind, and protrusions that are provided on both sides of the first wind receiving plate and the second wind receiving plate in a left-right direction, that extend in an upper-lower direction, and in each of which a lower portion protrudes on a front side with respect to the first wind receiving plate and an upper portion protrudes on a front side with respect to the second wind receiving plate, the second wind receiving plate is disposed such that a front end portion thereof is on an upper side and a rear side with respect to a front end portion of the first wind receiving plate, a gap is provided between the first wind receiving plate and the second wind receiving plate, and a wind guide path that causes outside of the under cowl and inside of the under cowl to communicate with each other and that introduces a traveling wind that flows from a front side to a rear side of the under cowl into the under cowl is provided at a portion on a right side with respect to the right protrusion or a portion on a left side with respect to the left protrusion in the front wall portion.

* * * * *